US012750189B2

(12) United States Patent
Kasi et al.

(10) Patent No.: US 12,750,189 B2
(45) Date of Patent: Sep. 29, 2026

(54) TECHNIQUES FOR EXTENDED CHANNEL STATE INFORMATION-REFERENCE SIGNAL PORTS

(71) Applicant: QUALCOMM Incorporated, San Diego, CA (US)

(72) Inventors: Shahrukh Khan Kasi, San Diego, CA (US); Lei Xiao, San Jose, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/431,426

(22) Filed: Feb. 2, 2024

(65) Prior Publication Data

US 2025/0254000 A1 Aug. 7, 2025

(51) Int. Cl.
*H04L 5/00* (2006.01)

(52) U.S. Cl.
CPC .................................. *H04L 5/0051* (2013.01)

(58) Field of Classification Search
CPC ............... H04W 72/231; H04W 72/23; H04W 72/0446; H04W 72/232; H04W 72/1263; H04L 1/1812; H04L 5/0051; H04L 5/005; H04L 5/004
See application file for complete search history.

(56) References Cited

U.S. PATENT DOCUMENTS

| | | | | |
|---|---|---|---|---|
| 11,071,172 | B2 | 7/2021 | He et al. | |
| 2016/0112977 | A1* | 4/2016 | Byun | H04W 72/541 370/350 |
| 2016/0285932 | A1* | 9/2016 | Thyamagundalu | H04L 12/4633 |
| 2022/0400527 | A1 | 12/2022 | Yoon | |
| 2023/0361829 | A1* | 11/2023 | Sun | H04B 7/0626 |

* cited by examiner

*Primary Examiner* — Wei Zhao
(74) *Attorney, Agent, or Firm* — Holland & Hart LLP/QUALCOMM Incorporated

(57) ABSTRACT

Methods, systems, and devices for wireless communications are described. A user equipment (UE) may receive, from a network entity, an indication of a quantity of channel state information (CSI)-reference signal (RS) ports to be used by the network entity for transmission of a CSI-RS. The quantity of CSI-RS ports may be greater than 32 and have a first CSI-RS port pattern. The first CSI-RS port pattern may be an extension of a second CSI-RS port pattern for 32 or fewer CSI-RS ports. The extension may include an extension of code division multiplexing (CDM) groups of the second CSI-RS port pattern in a time domain and a down-sampling in a frequency domain of the CDM groups of the second CSI-RS port pattern across multiple resource blocks. The UE may receive the CSI-RS via the quantity of CSI-RS ports in accordance with the first CSI-RS port pattern and estimate a channel.

20 Claims, 17 Drawing Sheets

TECHNIQUES FOR EXTENDED CHANNEL STATE INFORMATION-REFERENCE SIGNAL PORTS

FIELD OF DISCLOSURE

The following relates to wireless communications, including techniques for extended channel state information (CSI)-reference signal (RS) ports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some examples, wireless communication devices may transmit channel state information-reference signals (CSI-RSs) via a quantity of CSI-RS antenna ports.

SUMMARY

The described techniques relate to improved methods, systems, devices, and apparatuses that support techniques for extended channel state information (CSI)-reference signal (RS) ports. For example, the described techniques provide for CSI-RS port patterns when a quantity of CSI-RS ports exceeds 32. A user equipment (UE) may receive an indication of CSI-RS ports to be used by a network entity for transmission of a CSI-RS. For example, the network entity may indicate a quantity of CSI-RS ports and a first CSI-RS port pattern, where the quantity of CSI-RS ports is greater than 32. The first CSI-RS port pattern may be an extended version of a second CSI-RS port pattern for 32 or fewer CSI-RS ports. For example, the second CSI-RS port pattern may be extended via an extension of code division multiplexing (CDM) groups in a time domain and a down-sampling in a frequency domain across multiple resource blocks. The extension of the CDM groups in the time domain may, in some examples, include duplicates of each CDM group or additional CDM groups. For example, the CDM groups may be repeated or otherwise time division multiplexed to generate additional CDM groups. The UE may receive the CSI-RS according to the first CSI-RS port pattern and estimate the channel.

A method for wireless communications by a UE is described. The method may include receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks, receiving, from the network entity, the CSI-RS via the quantity of CSI-RS ports in accordance with the first CSI-RS port pattern, and estimating a channel based on the received CSI-RS.

A UE for wireless communications is described. The UE may include one or more memories storing processor executable code, and one or more processors coupled with the one or more memories. The one or more processors may individually or collectively be operable to execute the code to cause the UE to receive, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks, receive, from the network entity, the CSI-RS via the quantity of CSI-RS ports in accordance with the first CSI-RS port pattern, and estimate a channel based on the received CSI-RS.

Another UE for wireless communications is described. The UE may include means for receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks, means for receiving, from the network entity, the CSI-RS via the quantity of CSI-RS ports in accordance with the first CSI-RS port pattern, and means for estimating a channel based on the received CSI-RS.

A non-transitory computer-readable medium storing code for wireless communications is described. The code may include instructions executable by one or more processors to receive, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks, receive, from the network entity, the CSI-RS via the quantity of CSI-RS ports in accordance with the first CSI-RS port pattern, and estimate a channel based on the received CSI-RS.

In some examples of the method, UEs, and non-transitory computer-readable medium described herein, the extension of the set of multiple CDM groups in the time domain includes extensions to each of the set of multiple CDM groups of the second CSI-RS port pattern, the extensions duplicates, in the time domain, each of the set of multiple CDM groups.

In some examples of the method, UEs, and non-transitory computer-readable medium described herein, the extension of the set of multiple CDM groups in the time domain includes one or more CDM groups in addition to the set of multiple CDM groups of the second CSI-RS port pattern, the one or more additional CDM groups being time division multiplexed in addition to the set of multiple CDM groups.

Some examples of the method, UEs, and non-transitory computer-readable medium described herein may further include operations, features, means, or instructions for receiving, from the network entity, a resource allocation indicating a quantity of resource blocks to be used for receiving the CSI-RS, where receiving the CSI-RS may be in accordance with the resource allocation.

In some examples of the method, UEs, and non-transitory computer-readable medium described herein, the quantity of resource blocks may be in accordance with a multiple of the quantity of CSI-RS ports, the multiple based on the quantity of CSI-RS ports.

In some examples of the method, UEs, and non-transitory computer-readable medium described herein, the quantity of resource blocks may be based on an inverse of a density of the first CSI-RS port pattern.

In some examples of the method, UEs, and non-transitory computer-readable medium described herein, estimating the channel may include operations, features, means, or instructions for de-spreading the received CSI-RS, the de-spreading including a separation of the set of multiple CDM groups according to the first CSI-RS port pattern, determining a channel impulse response based on a transformation of the CSI-RS from the frequency domain to the time domain via an inverse fast Fourier transform (IFFT), determining a denoised channel impulse response based on applying a cleaning algorithm to the determined channel impulse response, and determining an interpolated channel based on zero-padding the determined denoised channel response and applying a fast Fourier transform (FFT) FFT, where the interpolated channel includes an estimate of the channel.

Some examples of the method, UEs, and non-transitory computer-readable medium described herein may further include operations, features, means, or instructions for transmitting, to the network entity, a channel report based on estimating the channel.

In some examples of the method, UEs, and non-transitory computer-readable medium described herein, the first CSI-RS port pattern and the second CSI-RS port pattern may be of a set of multiple CSI-RS port patterns.

In some examples of the method, UEs, and non-transitory computer-readable medium described herein, the quantity of CSI-RS ports may be 128.

A method for wireless communications by a network entity is described. The method may include transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks and transmitting, to the UE, the CSI-RS via the quantity of CSI-RS ports in accordance with the first CSI-RS port pattern.

A network entity for wireless communications is described. The network entity may include one or more memories storing processor executable code, and one or more processors coupled with the one or more memories. The one or more processors may individually or collectively be operable to execute the code to cause the network entity to transmit, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks and transmit, to the UE, the CSI-RS via the quantity of CSI-RS ports in accordance with the first CSI-RS port pattern.

Another network entity for wireless communications is described. The network entity may include means for transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks and means for transmitting, to the UE, the CSI-RS via the quantity of CSI-RS ports in accordance with the first CSI-RS port pattern.

A non-transitory computer-readable medium storing code for wireless communications is described. The code may include instructions executable by one or more processors to transmit, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks and transmit, to the UE, the CSI-RS via the quantity of CSI-RS ports in accordance with the first CSI-RS port pattern.

In some examples of the method, network entities, and non-transitory computer-readable medium described herein, the extension of the set of multiple CDM groups in the time domain includes extensions to each of the set of multiple CDM groups of the second CSI-RS port pattern, the extensions duplicates, in the time domain, each of the set of multiple CDM groups.

In some examples of the method, network entities, and non-transitory computer-readable medium described herein, the extension of the set of multiple CDM groups in the time domain includes one or more CDM groups in addition to the set of multiple CDM groups of the second CSI-RS port pattern, the one or more additional CDM groups being time division multiplexed in addition to the set of multiple CDM groups.

Some examples of the method, network entities, and non-transitory computer-readable medium described herein may further include operations, features, means, or instructions for transmitting, to the UE, a resource allocation indicating a quantity of resource blocks to be used for receiving the CSI-RS, where transmitting the CSI-RS may be in accordance with the resource allocation.

In some examples of the method, network entities, and non-transitory computer-readable medium described herein, the quantity of resource blocks may be in accordance with a multiple of the quantity of CSI-RS ports, the multiple based on the quantity of CSI-RS ports.

In some examples of the method, network entities, and non-transitory computer-readable medium described herein, the quantity of resource blocks may be based on an inverse of a density of the first CSI-RS port pattern.

Some examples of the method, network entities, and non-transitory computer-readable medium described herein may further include operations, features, means, or instructions for receiving, from the UE, a channel report based on transmitting the CSI-RS.

In some examples of the method, network entities, and non-transitory computer-readable medium described herein, the first CSI-RS port pattern and the second CSI-RS port pattern may be of a set of multiple CSI-RS port patterns.

In some examples of the method, network entities, and non-transitory computer-readable medium described herein, the quantity of CSI-RS ports may be 128.

DETAILED DESCRIPTION

Figure 1:
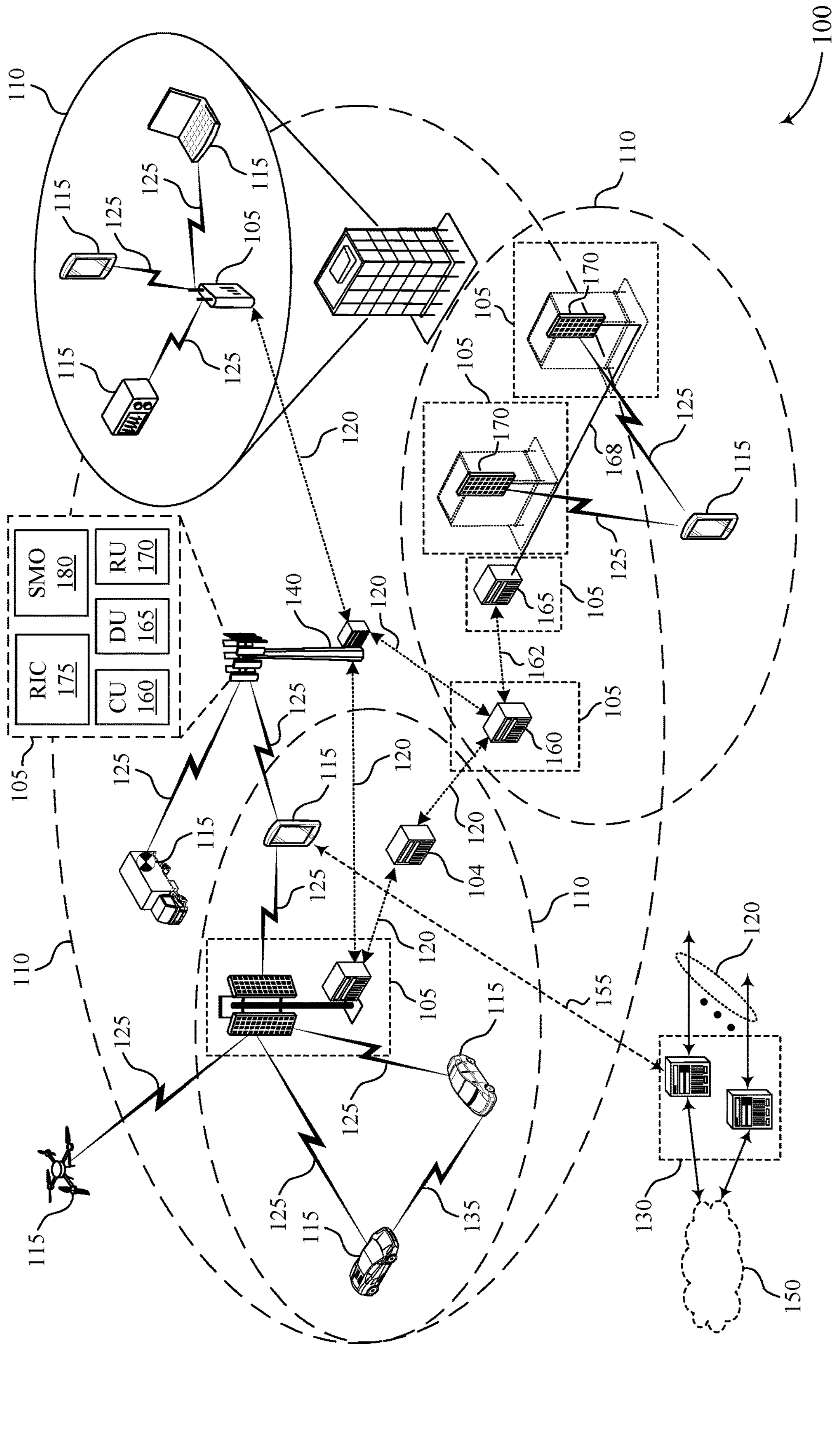
FIGS. 1 and 2 show examples of wireless communications systems that support techniques for extended channel state information (CSI)-reference signal (RS) ports in accordance with one or more aspects of the present disclosure.

Wireless devices, including network entities and user equipments (UEs) may support multiple-input multiple-output (MIMO) communications. For example, the network entity may use multiple antennas to transmit reference signals to other wireless communication devices. As an example, the network entity may use a quantity of antenna ports for transmission of a channel state information (CSI)-reference signal (RS) to a UE. The transmission of the CSI-RS may be used for CSI acquisition, beam management, and tracking. In some cases, CSI-RS transmission may be periodic (e.g., P-CSI-RS), aperiodic (e.g., A-CSI-RS), or semipersistent (e.g., AP-CSI-RS).

In some cases, a CSI-RS transmission using a greater quantity of antenna ports may be associated with more accurate beamforming, which may increase a downlink beamforming gain. Additionally, or alternatively, the greater quantity of antenna ports may support increased spatial dimensions and increase a downlink multiple-user capacity. However, some CSI-RS port pattern designs may not support the greater quantity of CSI-RS ports. As an example, some CSI-RS port pattern designs may be applicable to 32 or fewer ports (e.g., 1, 2, 4, 8, 12, 16, 24, or 32 ports), while the greater quantity of CSI-RS ports may be greater than 32 ports (e.g., 48, 64, 96, or 128 ports). The CSI-RS port pattern designs applicable to 32 or fewer ports may not be extended in a frequency domain as the extension may decrease a density of the CSI-RS ports. A decrease in the density of the CSI-RS ports may be associated with a lower channel estimation performance level compared to a higher density of the CSI-RS ports. Further, an extension of the CSI-RS port pattern designs in the time domain may exceed a slot duration (e.g., 14 symbols). Additionally, or alternatively, ports of the CSI-RS may be associated with mismatched quantities of observations. For example, the UE may observe a CSI-RS port multiple times in accordance the CSI-RS port pattern repeating over allocated resource blocks. Because the CSI-RS port pattern repeats over the allocated resource blocks, some CSI-RS ports may repeat more or less than others. That is, if the quantity of resource blocks is not a multiple of the quantity of CSI-RS ports, there may be a mismatch in a quantity of observations across CSI-RS ports at the UE. In cases where mismatched quantities of observations for different CSI-RS ports are present, the CSI-RS ports with fewer observations may have a lower channel estimation performance level than the CSI-RS ports with more observations.

As described herein, CSI-RS port patterns for quantities of CSI-RS ports equal to or less than 32 may be extended to support quantities of CSI-RS ports greater than 32. For example, the first CSI-RS pattern associated with greater than 32 ports may be an extended version of the second CSI-RS pattern associated with 32 or fewer ports. In some aspects, code division multiplexing (CDM) groups of the second CSI-RS pattern may be extended in a time domain and decimated, or down-sampled, in a frequency domain across multiple resource blocks. In some examples, the CDM groups may be extended in the time domain via repetitions of CDM groups or by time division multiplexing additional CDM groups. The first CSI-RS pattern, being an extension of the second CSI-RS pattern, may have a CSI-RS port density greater than that of a CSI-RS pattern extended solely via frequency domain.

Additionally, or alternatively, the network entity may configure the UE with a resource allocation, where a quantity of resource blocks of the resource allocation is in accordance with the quantity of CSI-RS ports. That is, the network entity may indicate the resource allocation to the UE such that the quantity of port observations at the UE across CSI-RS ports may be the same. Additionally, or alternatively, the UE may perform a channel estimation procedure compensating for different quantities of port observations for different CSI-RS ports across a set of resource blocks (RBs) at the UE. For example, the UE may transform the received CSI-RS according to a channel estimation algorithm accounting for a discrepancy between the port observations for different CSI-RS ports.

Particular aspects of the subject matter described in this disclosure can be implemented to realize one or more of the following potential advantages. In some implementations, for example, by extending CSI-RS port patterns in the time domain and in the frequency domain, the network entity, the UE, or both may support sharper beamforming, increased beamforming gain, and a greater quantity of spatial dimensions compared to CSI-RS port patterns for 32 or fewer CSI-RS ports. For example, extending the CSI-RS port patterns in both the time domain and the frequency domain may support use of additional CSI-RS ports (e.g., greater than 32 CSI-RS ports) with a relatively small decrease in CSI-RS port density compared to extending CSI-RS port patterns in one of the time domain or the frequency domain. Additionally, accounting for mismatched observations of CSI-RS ports at the UE, either via allocating resource blocks accordingly or by transforming the received CSI-RS according to the channel estimation algorithm, may be associated with improved channel estimation performance compared to cases in which the mismatched observations are unaccounted for.

Aspects of the disclosure are initially described in the context of wireless communications systems. Aspects of the disclosure are also described in the context of CSI-RS port pattern extension diagrams and process flows. Aspects of the disclosure are further illustrated by and described with reference to apparatus diagrams, system diagrams, and flowcharts that relate to techniques for extended CSI-RS ports.

FIG. 1 shows an example of a wireless communications system 100 that supports techniques for extended CSI-RS ports in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, the UE 115 may receive an indication of CSI-RS ports to be used by the network entity 105 for transmission of a CSI-RS. For example, the network entity may indicate a quantity of CSI-RS ports and a first CSI-RS port pattern, where the quantity of CSI-RS ports is greater than 32. The first CSI-RS port pattern may be an extended version of a second CSI-RS port pattern for 32 or fewer CSI-RS ports. For example, the second CSI-RS port pattern may be extended via an extension of CDM groups in a time domain and a down-sampling in a frequency domain across multiple resource blocks. The extension of the CDM groups in the time domain may, in some examples, include duplicates of each CDM group or additional CDM groups. For example, the CDM groups may be repeated or otherwise time division multiplexed to generate additional CDM groups. The UE 115 may receive the CSI-RS from the network entity 105 according to the first CSI-RS port pattern and estimate the channel.

Figure 2:
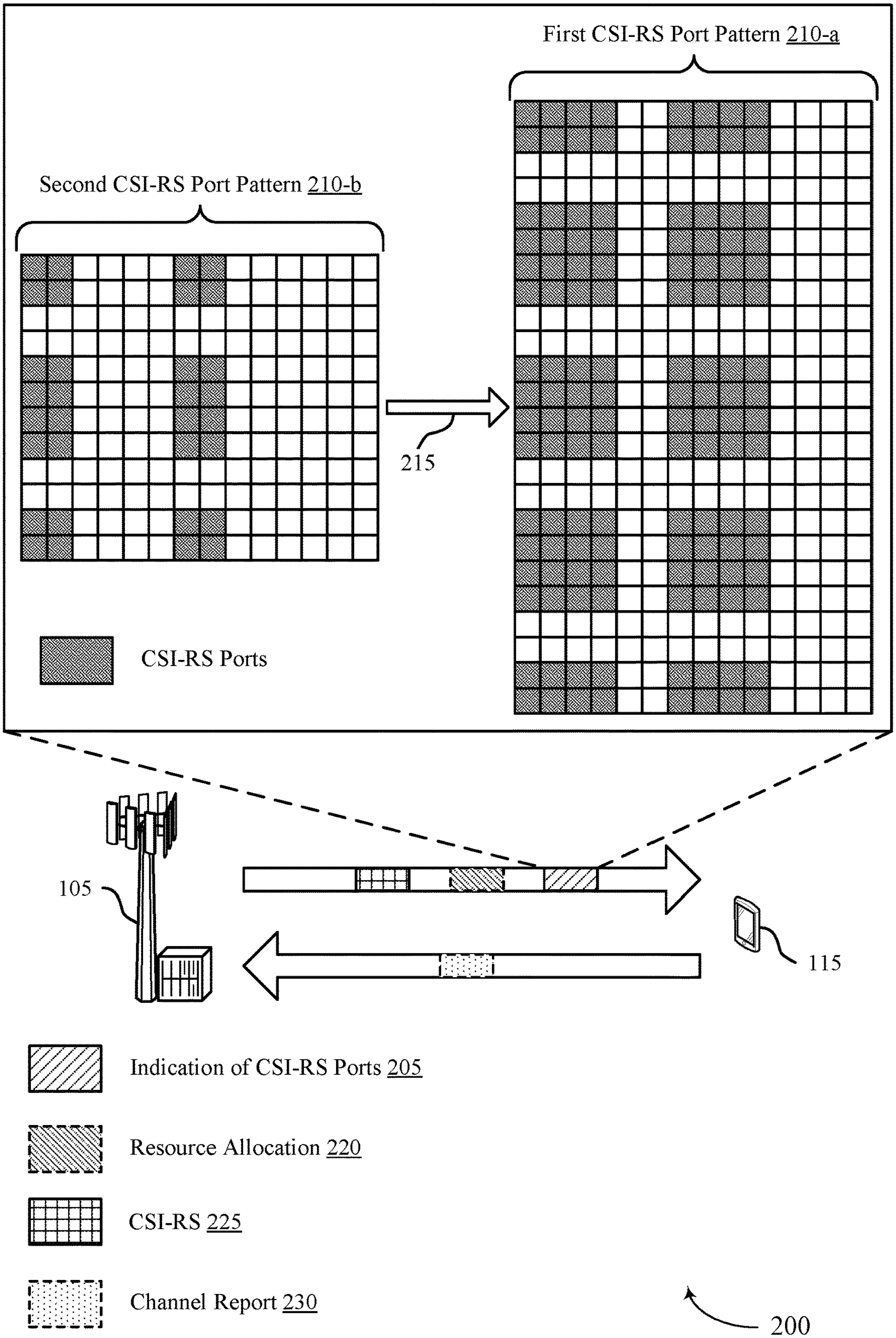

FIG. 2 shows an example of a wireless communications system 200 that supports techniques for extended CSI-RS ports in accordance with one or more aspects of the present disclosure. The wireless communications system 200 may implement or be implemented by various aspects of the wireless communications system 100. For example, the wireless communications system 200 may include a network entity 105 and a UE 115, which may represent examples of corresponding devices as described with reference to FIG. 1.

The network entity 105 may transmit one or more CSI-RSs to the UE 115. As an example, the network entity 105 may transmit the one or more CSI-RSs to the UE to support a channel estimation procedure at the UE 115. In some examples, the network entity 105 may transmit a CSI-RS 225 using a quantity of CSI-RS ports exceeding 32. For example, the network entity 105 may transmit and the UE 115 may receive the CSI-RS 225 using 48, 64, 96, or 128 ports.

The network entity 105 may transmit an indication of CSI-RS ports 205 to the UE 115. For example, the indication of CSI-RS ports 205 may include the quantity of CSI-RS ports to be used for transmission of the CSI-RS 225, a CSI-RS port pattern, or both. The CSI-RS port pattern indicated via the indication of CSI-RS ports 205, such as a first CSI-RS port pattern 210-*a*, may be an extended version of a second CSI-RS port pattern 210-*b*. For example, the second CSI-RS port pattern 210-*b* may include fewer CSI-RS ports than the first CSI-RS port pattern 210-*a*. As illustrated by the example of FIG. 2, the second CSI-RS port pattern 210-*b* may include 32 ports while the first CSI-RS port pattern 210-*a* may include 128 ports.

The network entity 105 may extend the second CSI-RS port pattern 210-*b* to accommodate additional ports. In the example of FIG. 2, the network entity 105 may extend the second CSI-RS port pattern 210-*b* including 32 ports to include 128 ports. In some examples, the network entity 105 may extend the second CSI-RS port pattern 210-*b* via an extension 215. The extension 215 may include an extension of CDM groups of the second CSI-RS port pattern 210-*b* in a time domain. For example, the extension 215 may include repetitions or duplicates of CDM groups of the second CSI-RS port pattern 210-*b* in the time domain. Alternatively, the network entity 105 may extend the CDM pattern in the time domain by time division multiplexing additional CDM groups. That is, the first CSI-RS port pattern 210-*a* may include repetitions of CDM groups of the second CSI-RS port pattern 210-*b* in the time domain or additional (e.g., different) CDM groups in the time domain.

The extension 215 may also include a down-sampling, or decimation, of CDM groups of the second CSI-RS port pattern 210-*b* in a frequency domain across multiple resource blocks. For example, the extension 215 may include an addition of one or more resource blocks to the second CSI-RS port pattern 210-*b*. That is, the network entity 105 may transmit a CSI-RS according to the second CSI-RS port pattern 210-*b* using fewer resource blocks than the CSI-RS 225 transmitted according to the first CSI-RS port pattern 210-*a*.

The extension 215 may at least include an extension of the CDM groups of the second CSI-RS port pattern 210-*b* in the time domain and a down-sampling of the CDM groups of the second CSI-RS port pattern 210-*b* in the frequency domain over multiple resource blocks. In other words, the extension 215 may include the down-sampling of the CDM groups in the frequency domain and one of: repetitions of CDM groups or additional CDM groups via time division multiplexing.

In some examples, the network entity 105 may restrict a quantity of resource blocks over which CSI-RSs may be transmitted. For example, the UE 115 may observe a CSI-RS port multiple times in accordance with a density of the first CSI-RS port pattern 210-*a*. That is, the CSI-RS port pattern may repeat over the allocated resource blocks, and, in some examples, CSI-RS ports of the first CSI-RS port pattern 210-*a* may repeat more or less than others. In other words, the UE 115 may have a mismatch in a quantity of observations across CSI-RS ports. The mismatch in the quantity of observations across CSI-RS ports may reduce a channel estimation quality at the UE 115 (e.g., especially for CSI-RS ports at an edge of a resource block). As an example, if the network entity 105 transmits the CSI-RS 225 via 63 resource blocks for a CSI-RS port pattern including 128 CSI-RS ports, such as the first CSI-RS port pattern 210-*a*, the CSI-RS ports on odd-numbered resource blocks (e.g., P0, P1, . . . . P63) may have 32 observations by the UE 115 while the CSI-RS ports on even-numbered resource blocks (e.g., P64, P65, . . . , P127) may have 31 observations by the UE 115.

In some aspects, the network entity 105 may set a restriction for the quantity of resource blocks in accordance with a quantity of CSI-RS ports to be used for the CSI-RS 225. As an example, the network entity 105 may allocate a quantity of resource blocks that is a multiple of 2 for 64 CSI-RS ports, a multiple of 3 for 96 CSI-RS ports, and a multiple of 4 for 128 CSI-RS ports. Additionally, or alternatively, the network entity 105 may set the restriction for the quantity of resource blocks in accordance with a density of the first CSI-RS port pattern 210-*a*. For example, the network entity 105 may allocate the quantity of resource blocks as a multiple of the inverse of the CSI density according to Equation 1, where n represents the quantity of resource blocks and x represents the density of the CSI-RS port pattern.

$$\text{ceil}\left(\frac{1}{x}\right) = n \tag{1}$$

As an example, the quantity of resource blocks for a CSI-RS port pattern with a density of 0.5 may be 2 resource blocks, and allocated resource blocks may be a multiple of 2.

The network entity 105 may transmit a resource allocation 220 according to the restriction. For example, the network entity 105 may transmit the resource allocation 220 where a quantity of resource blocks of the resource allocation is a multiple of the quantity of CSI-RS ports or where the quantity of resource blocks is a ceiling function of an inverse of the density of the first CSI-RS port pattern 210-*a* (e.g., according to Equation 1). Additionally, or alternatively, the network entity 105 may refrain from enforcing the restriction. That is, the network entity 105 may determine the resource allocation 220 regardless of the quantity of CSI-RS ports, the first CSI-RS port pattern 210-*a*, or both.

The UE 115 may perform channel estimation based on receiving the CSI-RS 225. For example, the UE 115 may measure the received CSI-RS 225 to estimate the channel. In some examples, the UE 115 may use a channel estimation algorithm to estimate the channel. The channel estimation algorithm may compensate for discrepancies in observations of the CSI-RS ports by the UE 115. For example, the UE 115 may use the channel estimation algorithm when the network entity 105 does not enforce the restriction on the quantity of resource blocks in the resource allocation 220.

The channel estimation algorithm may include de-spreading a received CSI-RS frequency domain channel for each CSI-RS port. That is, for each port $P_i$ for i=0, 1, . . . , 127, the UE 115 may de-spread the received CSI-RS frequency domain channel. For example, the UE 115 may identify individual ports within same CDM groups. As an example, a first subcarrier and a second subcarrier of a first resource element may be associated with a same CDM group. The UE 115 may identify, within the CDM group, that the first subcarrier-first resource element corresponds to a first port (e.g., P0) while the second subcarrier-first resource element corresponds to a second port (e.g., P1). That is, the UE 115 may identify multiple CSI-RS ports within the received CSI-RS 225.

The UE 115 may obtain a channel impulse response by calculating (e.g., determining, computing) an inverse fast Fourier transform (IFFT) of a size of a quantity of observations. That is, the UE 115 may transform the CSI-RS 225 received via a frequency domain to a time domain. Additionally, or alternatively, the UE 115 may denoise the channel impulse response via a cleaning algorithm, such as a minimum mean square error (MMSE) cleaning algorithm. For example, the UE 115 may remove noise from (e.g., "clean") the CSI-RS 225 in the time domain (e.g., the channel impulse response).

The UE 115 may obtain an interpolated channel (e.g., for all subcarriers) via zero-padding the quantity of observations and computing an FFT. For example, the UE 115 may apply the FFT to obtain a channel for each subcarrier of a given resource element. The interpolated channel may represent an estimation of the channel that accounts for mismatched quantities of observations across CSI-RS ports.

The UE 115 may transmit a channel report 230 to the network entity 105 based on the channel estimation. For example, the channel report 230 may be based on the channel estimation performed by the UE 115 using the channel estimation algorithm.

Figure 3:
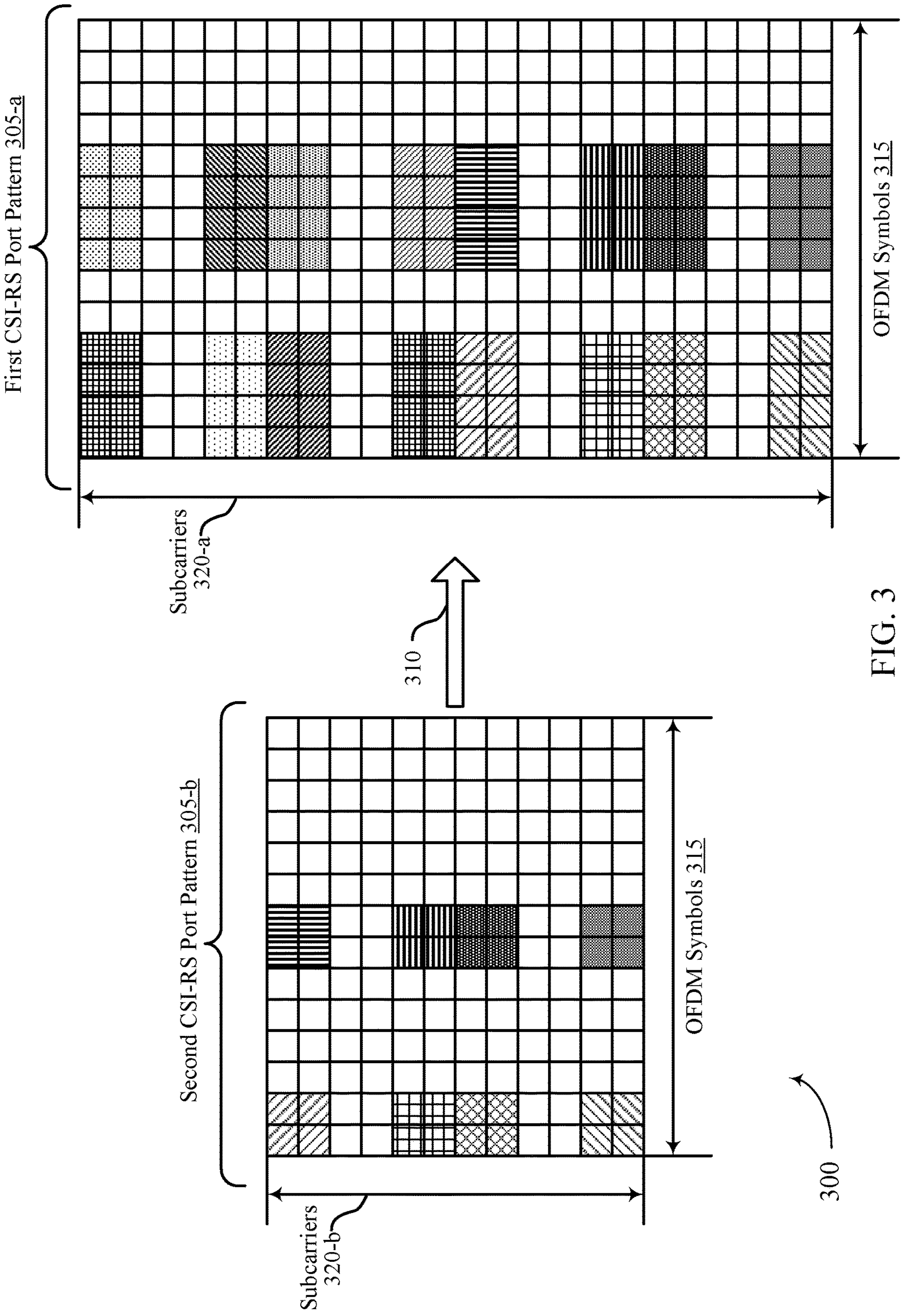
FIGS. 3 and 4 show examples of CSI-RS port pattern extension diagrams that support techniques for extended CSI-RS ports in accordance with one or more aspects of the present disclosure.

FIG. 3 shows an example of a CSI-RS port pattern extension diagram 300 that supports techniques for extended CSI-RS ports in accordance with one or more aspects of the present disclosure. The CSI-RS port pattern extension diagram 300 may implement or be implemented by various aspects of the wireless communications system 100, the wireless communications system 200, or both. For example, the CSI-RS port pattern extension diagram 300 may represent an extension of a CSI-RS port pattern for a CSI-RS transmitted from the network entity 105 to the UE 115, as shown with reference to FIG. 2. Additionally, the CSI-RS port pattern extension diagram 300 may represent a first CSI-RS port pattern 305-*a*, which may be an extension of a second CSI-RS port pattern 305-*b*. The first CSI-RS port pattern 305-*a*, the second CSI-RS port pattern 305-*b*, and an extension 310 may be correspond to the first CSI-RS port pattern 210-*a*, the second CSI-RS port pattern 210-*b*, and the extension 215, respectively, as described with reference to FIG. 2.

A network entity may transmit CSI-RSs to a UE via a quantity of CSI-RS ports and according to a CSI-RS port pattern. In some examples, the quantity of CSI-RS ports may exceed 32 ports. When the quantity of CSI-RS ports exceeds 32, the network entity may obtain the CSI-RS port pattern by extending a CSI-RS port pattern for 32 or fewer ports. For example, as illustrated by FIG. 3, the network entity may transmit CSI-RSs according to the first CSI-RS port pattern 305-*a*. The first CSI-RS port pattern 305-*a* may be an extension of the second CSI-RS port pattern 305-*b*. That is, the first CSI-RS port pattern 305-*a* may include greater than 32 ports while the second CSI-RS port pattern 305-*b* may include 32 or fewer ports.

The extension 310 of the second CSI-RS port pattern 305-*b* may include an extension of CDM groups of the second CSI-RS port pattern 305-*b* in a time domain. For example, the different patterns illustrated in the example of FIG. 3 may correspond to different CDM groups. In the extension 310, each of the CDM groups may be duplicated or replicated. For example, a first CDM group may occupy two OFDM symbols of OFDM symbols 315 in the second CSI-RS port pattern 305-*b*, whereas in the first CSI-RS port pattern 305-*a* the first CDM group may occupy four OFDM symbols. In another example, a first CDM group may occupy a first OFDM symbol and a second CDM group may occupy a second OFDM symbol in the second CSI-RS port pattern 305-*b*. After the extension 310, the first CDM group may occupy the first OFDM symbol and the second OFDM symbol, and the second CDM group may occupy a third OFDM symbol and a fourth OFDM symbol.

Additionally, the extension 310 of the second CSI-RS port pattern 305-*b* may include a down-sampling (e.g., decimation) of the CDM groups of the second CSI-RS port pattern 305-*b* across multiple resource blocks in a frequency domain. For example, the network entity may extend the second CSI-RS port pattern 305-*b* over a second resource block. That is, the second CSI-RS port pattern 305-*b* may span a single resource block, and the first CSI-RS port pattern 305-*a* may span two resource blocks. In other words, the second CSI-RS port pattern 305-*b* may span subcarriers 320-*b*, and the first CSI-RS port pattern 305-*a* may span subcarriers 320-*a*.

The CDM groups occupying the extended resource block (e.g., the second resource block) on the first CSI-RS port pattern 305-*a* may be different CDM groups than the CDM groups on the first resource block of the first CSI-RS port pattern 305-*a* or the CDM groups of the second CSI-RS port pattern 305-*b*. For example, the network entity may generate the CDM groups for the second resource block by down-sampling the CDM groups of the second CSI-RS port pattern 305-*b*.

Figure 4:
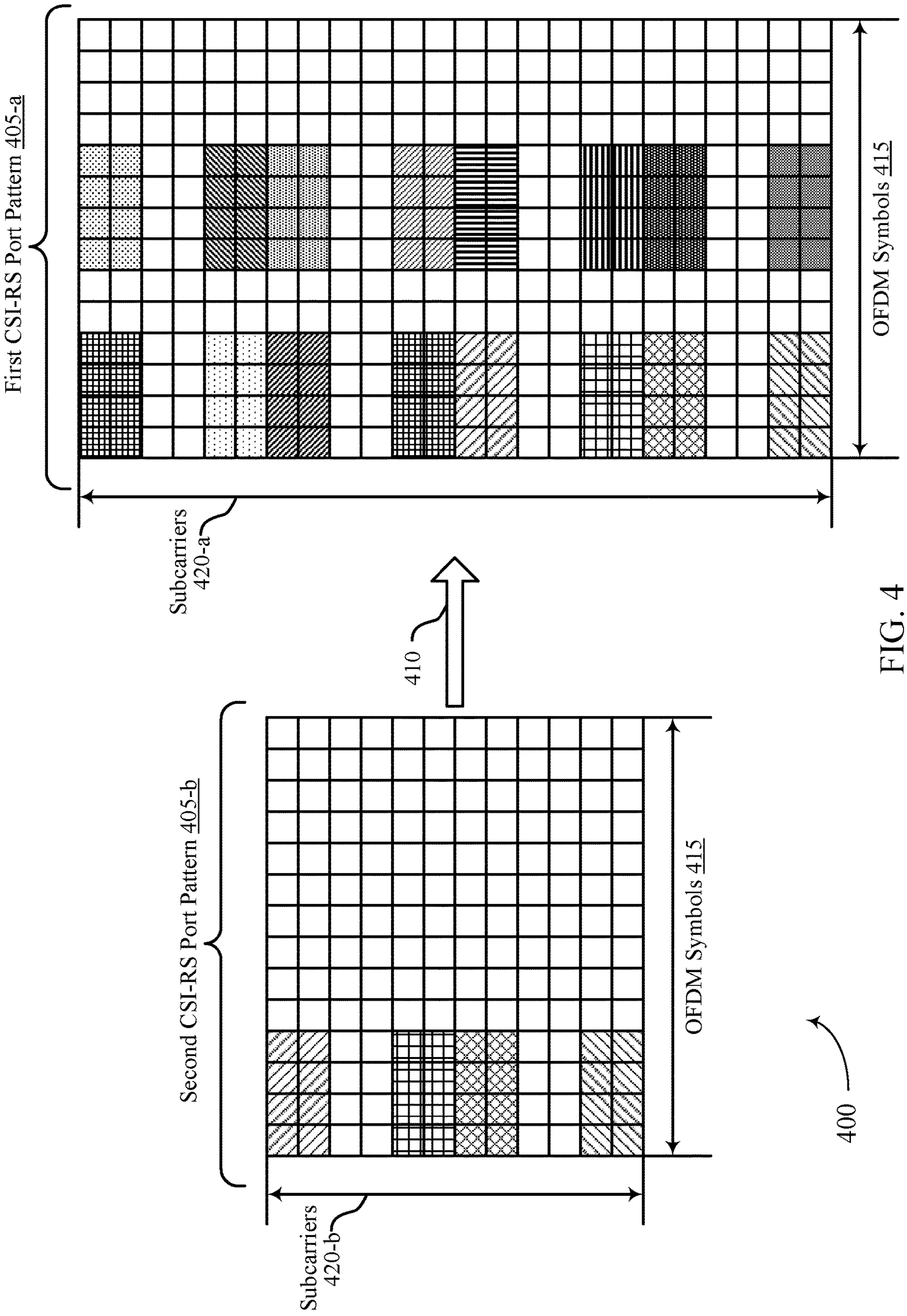

FIG. 4 shows an example of a CSI-RS port pattern extension diagram 400 that supports techniques for extended CSI-RS ports in accordance with one or more aspects of the present disclosure. The CSI-RS port pattern extension diagram 400 may implement or be implemented by various aspects of the wireless communications system 100, the wireless communications system 200, or both. For example, the CSI-RS port pattern extension diagram 400 may represent an extension of a CSI-RS port pattern for a CSI-RS transmitted from the network entity 105 to the UE 115, as shown with reference to FIG. 2. Additionally, the CSI-RS port pattern extension diagram 400 may represent a first CSI-RS port pattern 405-*a*, which may be an extension of a second CSI-RS port pattern 405-*b*. The first CSI-RS port pattern 405-*a*, the second CSI-RS port pattern 405-*b*, and an extension 410 may be correspond to the first CSI-RS port pattern 210-*a*, the second CSI-RS port pattern 210-*b*, and the extension 215, respectively, as described with reference to FIG. 2 or alternative examples of the first CSI-RS port pattern 305-*a*, the second CSI-RS port pattern 305-*b*, and the extension 310 as described with reference to FIG. 3.

A network entity may transmit CSI-RSs to a UE via a quantity of CSI-RS ports and according to a CSI-RS port pattern. In some examples, the quantity of CSI-RS ports may exceed 32 ports. When the quantity of CSI-RS ports exceeds 32, the network entity may obtain the CSI-RS port pattern by extending a CSI-RS port pattern for 32 or fewer ports. For example, as illustrated by FIG. 4, the network entity may transmit CSI-RSs according to the first CSI-RS port pattern 405-*a*. The first CSI-RS port pattern 405-*a* may be an extension of the second CSI-RS port pattern 405-*b*. That is, the first CSI-RS port pattern 405-*a* may include greater than 32 ports while the second CSI-RS port pattern 405-*b* may include 32 or fewer ports.

The extension 410 of the second CSI-RS port pattern 405-*b* may include an extension of CDM groups of the second CSI-RS port pattern 405-*b* in a time domain by time division multiplexing additional CDM groups in the time domain. For example, the different patterns illustrated in the example of FIG. 4 may correspond to different CDM groups. In the extension 410, each of the CDM groups of the second CSI-RS port pattern 405-*b* may be time division multiplexed. For example, a first CDM group may occupy four OFDM symbols of OFDM symbols 415 in the second CSI-RS port pattern 405-*b*, whereas in the first CSI-RS port pattern 405-*a* the first CDM group may occupy the same four OFDM symbols, and a second CDM group (e.g., a new CDM group) may occupy, following a two-symbol gap, a next four OFDM symbols. In another example, a first CDM group may occupy a first OFDM symbol and a second CDM group may occupy a second OFDM symbol in the second CSI-RS port pattern 405-*b*. After the extension 410, the first CDM group and the second CDM group may occupy the first and second OFDM symbols, respectively, while a third CDM group and fourth CDM group (e.g., new CDM groups) may occupy the third and fourth OFDM symbols.

Additionally, the extension 410 of the second CSI-RS port pattern 405-*b* may include a down-sampling (e.g., decimation) of the CDM groups of the second CSI-RS port pattern 405-*b* across multiple resource blocks in a frequency domain. For example, the network entity may extend the second CSI-RS port pattern 405-*b* over a second resource block. That is, the second CSI-RS port pattern 405-*b* may span a single resource block, and the first CSI-RS port pattern 405-*a* may span two resource blocks. In other words, the second CSI-RS port pattern 405-*b* may span subcarriers 420-*b*, and the first CSI-RS port pattern 405-*a* may span subcarriers 420-*a*.

The CDM groups occupying the extended resource block (e.g., the second resource block) on the first CSI-RS port pattern 405-*a* may be different CDM groups than the CDM groups on the first resource block of the first CSI-RS port pattern 405-*a* or the CDM groups of the second CSI-RS port pattern 405-*b*. For example, the network entity may generate the CDM groups for the second resource block by down-sampling the CDM groups of the second CSI-RS port pattern 405-*b*.

Figure 5:
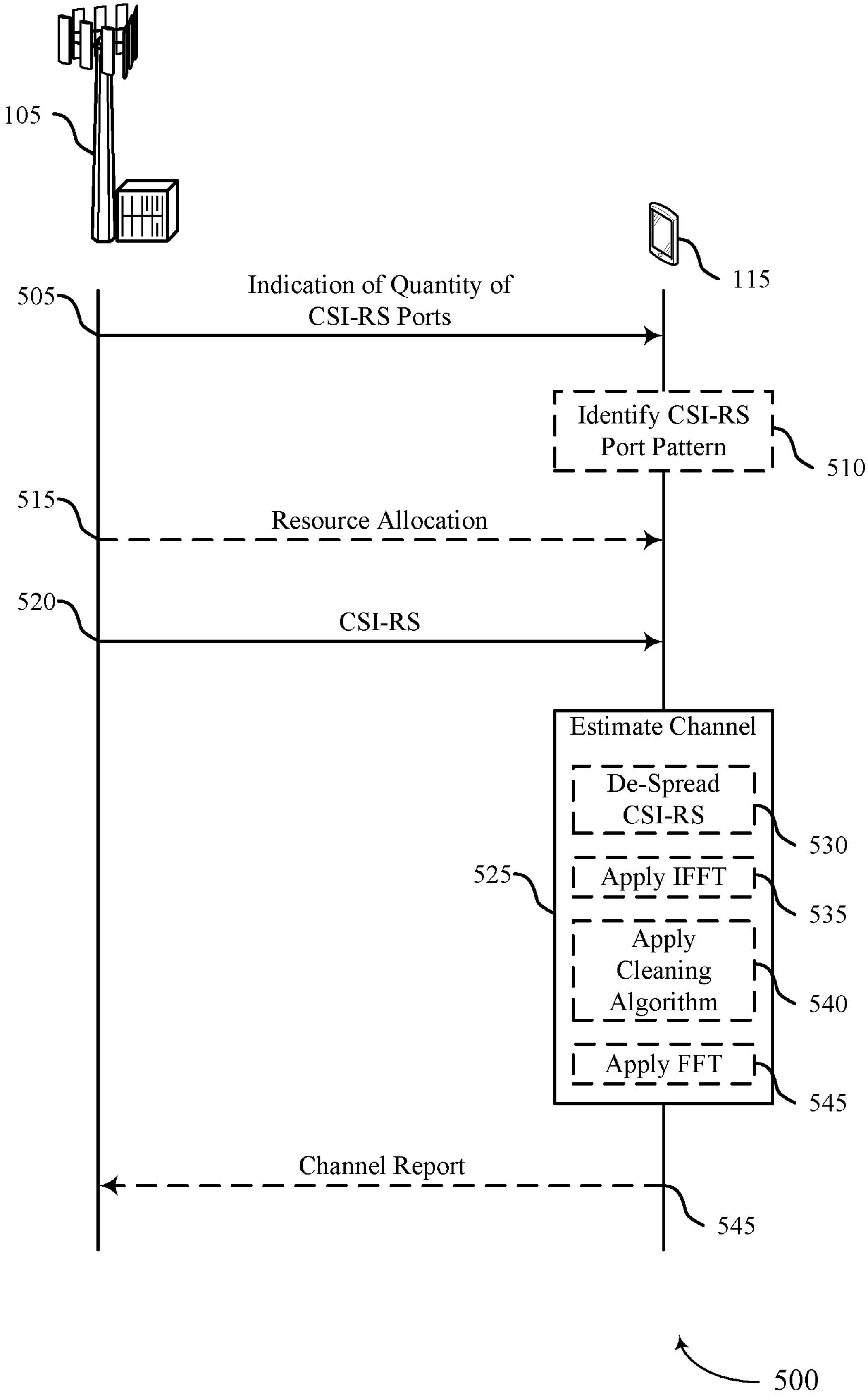
FIG. 5 shows an example of a process flow that supports techniques for extended CSI-RS ports in accordance with one or more aspects of the present disclosure.

FIG. 5 shows an example of a process flow 500 that supports techniques for extended CSI-RS ports in accordance with one or more aspects of the present disclosure. In some examples, the process flow 500 may implement or be implemented by aspects of the wireless communications system 100, the wireless communications system 200, the CSI-RS port pattern extension diagram 300, or the CSI-RS port pattern extension diagram 400 as described with reference to FIGS. 1 through 4. For example, the process flow 500 may include a network entity 105 and a UE 115, which may be examples of corresponding devices as described with reference to FIGS. 1 and 2.

Alternative examples of the following may be implemented, where some steps are performed in a different order than described or are not performed at all. In some cases, steps may include additional features not mentioned below, or further steps may be added. Although the network entity 105 and the UE 115 are shown performing the operations of the process flow 500, some aspects of some operations may also be performed by one or more other wireless devices (such as by a network entity 105 in accordance with coordination among multiple UEs 115).

At 505, the network entity 105 may transmit an indication of a quantity of CSI-RS ports to the UE 115. For example, the indication of the quantity of CSI-RS ports may be an example of the indication of CSI-RS ports 205 as described with reference to FIG. 2. The indication of the quantity of CSI-RS ports may be an indication of the quantity of CSI-RS ports to be used by the network entity 105 for transmission of a CSI-RS. The quantity of CSI-RS ports may be greater than 32 CSI-RS ports (e.g., 128 ports), and the quantity of CSI-RS ports may have a first CSI-RS port pattern, such as the first CSI-RS port pattern 210-*a*, the first CSI-RS port pattern 305-*a*, or the first CSI-RS port pattern 405-*a* as described with reference to FIGS. 2, 3, and 4, respectively.

The first CSI-RS port pattern may include an extension of a second CSI-RS port pattern for 32 or fewer CSI-RS ports, such as the second CSI-RS port pattern 210-*b*, the second CSI-RS port pattern 305-*b*, or the second CSI-RS port pattern 405-*b* as described with reference to FIGS. 2, 3, and 4, respectively. The second CSI-RS port pattern may be extended to include the quantity of CSI-RS ports associated with the first CSI-RS port pattern via an extension of multiple CDM groups of the second CSI-RS port pattern in a time domain and a down-sampling in a frequency domain of the multiple CDM groups of the second CSI-RS port pattern across multiple resource blocks. For example, the extension may be an example of the extension 215, the extension 310, or the extension 410 as described with reference to FIGS. 2, 3, and 4, respectively.

In some examples, the extension of the multiple CDM groups in the time domain may include extensions to each of the multiple CDM groups of the second CSI-RS port pattern, where the extensions are duplicates of each of the multiple CDM groups in the time domain. For example, the extension of the multiple CDM groups in the time domain may be an example of the extension 310 as described with reference to FIG. 3.

Additionally, or alternatively, the extension of the multiple CDM groups in the time domain may include one or more CDM groups in addition to the multiple CDM groups of the second CSI-RS port pattern, where the one or more additional CDM groups are time division multiplexed in addition to the multiple CDM groups. For example, the extension of the multiple CDM groups in the time domain may be an example of the extension 410 as described with reference to FIG. 4.

In some examples, the first CSI-RS port pattern and the second CSI-RS port pattern may be of multiple CSI-RS port patterns. For example, the first CSI-RS port pattern may be of multiple first CSI-RS port patterns for quantities of CSI-RS ports greater than 32 (e.g., 128). The second CSI-RS port pattern may be of multiple second CSI-RS port patterns for quantities of CSI-RS ports equal to or less than 32 (e.g., 32).

At 510, the UE 115 may identify the CSI-RS port pattern. For example, the UE 115 may identify the first CSI-RS port pattern based on the quantity of CSI-RS ports and the second CSI-RS port pattern. That is, the UE 115 may extend the second CSI-RS port pattern to obtain the first CSI-RS port pattern based on the quantity of CSI-RS ports indicated at 505.

At 515, the network entity 105 may transmit a resource allocation to the UE 115. For example, the resource allocation may be an example of the resource allocation 220 as described with reference to FIG. 2. The resource allocation may indicate a quantity of resource blocks to be used for receiving the CSI-RS.

In some examples, the quantity of resource blocks may be in accordance with a multiple of the quantity of CSI-RS ports. For example, the multiple may be based on the quantity of CSI-RS ports. As an example, the network entity 105 may allocate a quantity of resource blocks that is a multiple of 2 for 64 CSI-RS ports, a multiple of 3 for 96 CSI-RS ports, and a multiple of 4 for 128 CSI-RS ports. Additionally, or alternatively, the quantity of resource blocks may be based on an inverse of a density of the first CSI-RS port pattern. That is, the quantity of resource blocks may be in accordance with Equation 1 as described with reference to FIG. 2.

At 520, the network entity 105 may transmit the CSI-RS to the UE 115. For example, the CSI-RS may be an example of the CSI-RS 225 as described with reference to FIG. 2. The network entity 105 may transmit the CSI-RS using the quantity of CSI-RS ports indicated at 505. For example, the network entity 105 may transmit the CSI-RS according to the first CSI-RS port pattern. Additionally, or alternatively, the network entity 105 may transmit the CSI-RS in accordance with the resource allocation transmitted at 515. In other words, the UE 115 may receive the CSI-RS in accordance with the resource allocation.

At 525, the UE 115 may estimate the channel. For example, the UE 115 may estimate the channel based on the CSI-RS received at 520. In some examples, the channel estimation may include de-spreading the received CSI-RS at 530. For example, the de-spreading may include a separation of the multiple CDM groups according to the first CSI-RS port pattern. Additionally, or alternatively, the channel estimation may include applying an IFFT at 535. For example, the UE 115 may determine a channel impulse response based at least in part on a transformation of the CSI-RS from the frequency domain to the time domain via an IFFT. In some examples, the channel estimation may include applying a cleaning algorithm at 540. For example, the UE 115 may determine a denoised channel impulse response based on applying a cleaning algorithm (e.g., an MMSE cleaning algorithm) to the determined channel impulse response. Finally, the channel estimation may include applying a FFT at 545. For example, the UE 115 may determine an interpolated channel based on zero-padding the determined denoised channel response and applying a FFT. The interpolated channel may represent an estimate of the channel. That is, the interpolated channel may represent the estimate of the channel compensating for a discrepancy between observations of different CSI-RS ports.

At 545, the UE 115 may transmit a channel report to the network entity 105. For example, the UE 115 may transmit the channel report based on estimating the channel at 525.

Figure 6:
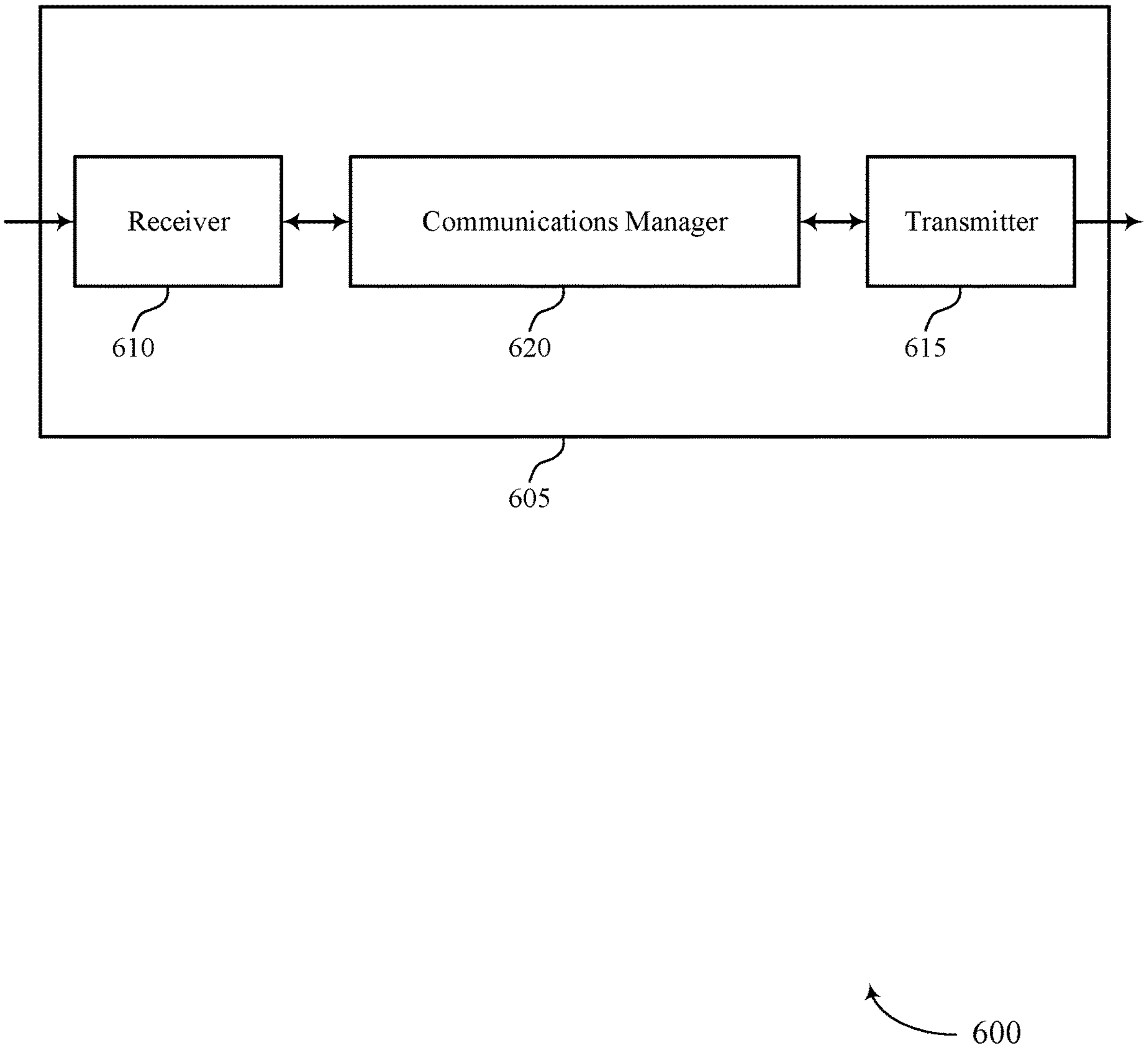
FIGS. 6 and 7 show block diagrams of devices that support techniques for extended CSI-RS ports in accordance with one or more aspects of the present disclosure.

FIG. 6 shows a block diagram 600 of a device 605 that supports techniques for extended CSI-RS ports in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for extended CSI-RS ports). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for extended CSI-RS ports). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations or components thereof may be examples of means for performing various aspects of techniques for extended CSI-RS ports as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The communications manager 620 is capable of, configured to, or operable to support a means for receiving, from the network entity, the CSI-RS via the quantity of CSI-RS ports in accordance with the first CSI-RS port pattern. The communications manager 620 is capable of, configured to, or operable to support a means for estimating a channel based on the received CSI-RS.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
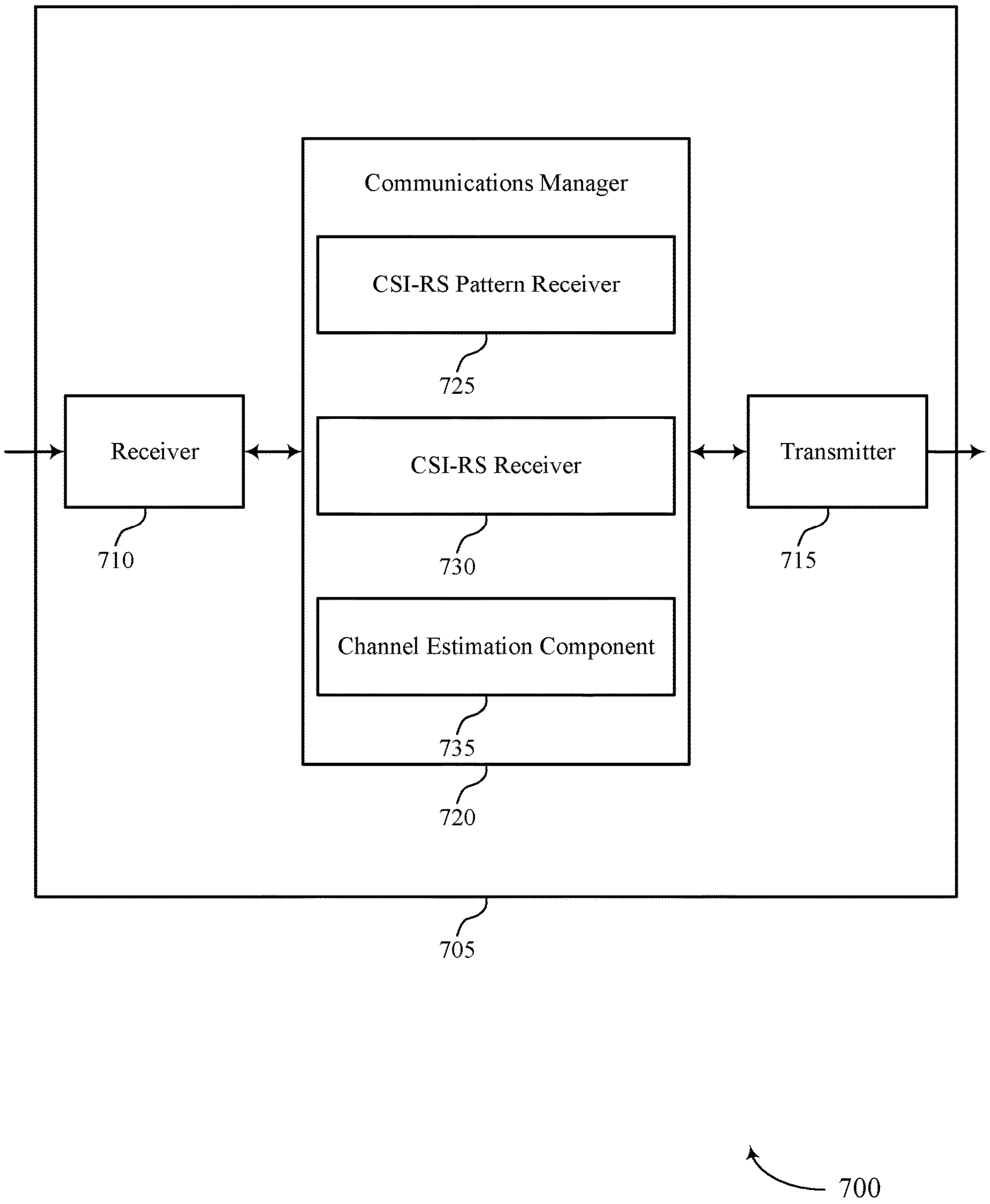

FIG. 7 shows a block diagram 700 of a device 705 that supports techniques for extended CSI-RS ports in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for extended CSI-RS ports). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for extended CSI-RS ports).

In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for extended CSI-RS ports as described herein. For example, the communications manager 720 may include a CSI-RS pattern receiver 725, a CSI-RS receiver 730, a channel estimation component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The CSI-RS pattern receiver 725 is capable of, configured to, or operable to support a means for receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The CSI-RS receiver 730 is capable of, configured to, or operable to support a means for receiving, from the network entity, the CSI-RS via the quantity of CSI-RS ports in accordance with the first CSI-RS port pattern. The channel estimation component 735 is capable of, configured to, or operable to support a means for estimating a channel based on the received CSI-RS.

Figure 8:
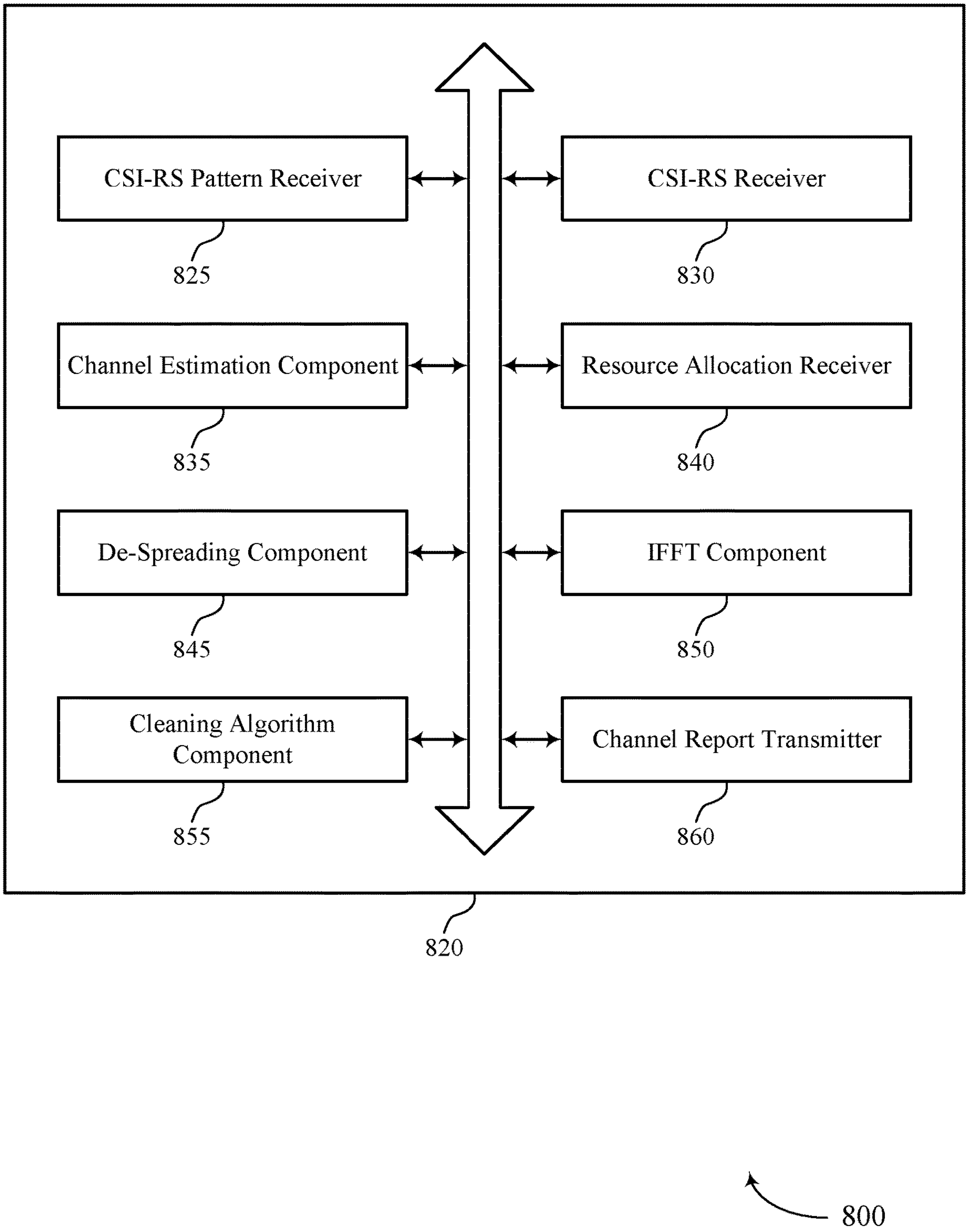
FIG. 8 shows a block diagram of a communications manager that supports techniques for extended CSI-RS ports in accordance with one or more aspects of the present disclosure.

FIG. 8 shows a block diagram 800 of a communications manager 820 that supports techniques for extended CSI-RS ports in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for extended CSI-RS ports as described herein. For example, the communications manager 820 may include a CSI-RS pattern receiver 825, a CSI-RS receiver 830, a channel estimation component 835, a resource allocation receiver 840, a de-spreading component 845, an IFFT component 850, a cleaning algorithm component 855, a channel report transmitter 860, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The CSI-RS pattern receiver 825 is capable of, configured to, or operable to support a means for receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The CSI-RS receiver 830 is capable of, configured to, or operable to support a means for receiving, from the network entity, the CSI-RS via the quantity of CSI-RS ports in accordance with the first CSI-RS port pattern. The channel estimation component 835 is capable of, configured to, or operable to support a means for estimating a channel based on the received CSI-RS.

In some examples, the extension of the set of multiple CDM groups in the time domain includes extensions to each of the set of multiple CDM groups of the second CSI-RS port pattern, the extensions duplicates, in the time domain, each of the set of multiple CDM groups.

In some examples, the extension of the set of multiple CDM groups in the time domain includes one or more CDM groups in addition to the set of multiple CDM groups of the second CSI-RS port pattern, the one or more additional CDM groups being time division multiplexed in addition to the set of multiple CDM groups.

In some examples, the resource allocation receiver 840 is capable of, configured to, or operable to support a means for receiving, from the network entity, a resource allocation indicating a quantity of resource blocks to be used for receiving the CSI-RS, where receiving the CSI-RS is in accordance with the resource allocation.

In some examples, the quantity of resource blocks is in accordance with a multiple of the quantity of CSI-RS ports, the multiple based on the quantity of CSI-RS ports.

In some examples, the quantity of resource blocks is based on an inverse of a density of the first CSI-RS port pattern.

In some examples, to support estimating the channel, the de-spreading component 845 is capable of, configured to, or operable to support a means for de-spreading the received CSI-RS, the de-spreading including a separation of the set of multiple CDM groups according to the first CSI-RS port pattern. In some examples, to support estimating the channel, the IFFT component 850 is capable of, configured to, or operable to support a means for determining a channel impulse response based on a transformation of the CSI-RS from the frequency domain to the time domain via an IFFT. In some examples, to support estimating the channel, the cleaning algorithm component 855 is capable of, configured to, or operable to support a means for determining a denoised channel impulse response based on applying a cleaning algorithm to the determined channel impulse response. In some examples, to support estimating the channel, the channel estimation component 835 is capable of, configured to, or operable to support a means for determining an interpolated channel based on zero-padding the determined denoised channel response and applying a FFT, where the interpolated channel includes an estimate of the channel.

In some examples, the channel report transmitter 860 is capable of, configured to, or operable to support a means for transmitting, to the network entity, a channel report based on estimating the channel.

In some examples, the first CSI-RS port pattern and the second CSI-RS port pattern are of a set of multiple CSI-RS port patterns.

In some examples, the quantity of CSI-RS ports is 128.

Figure 9:
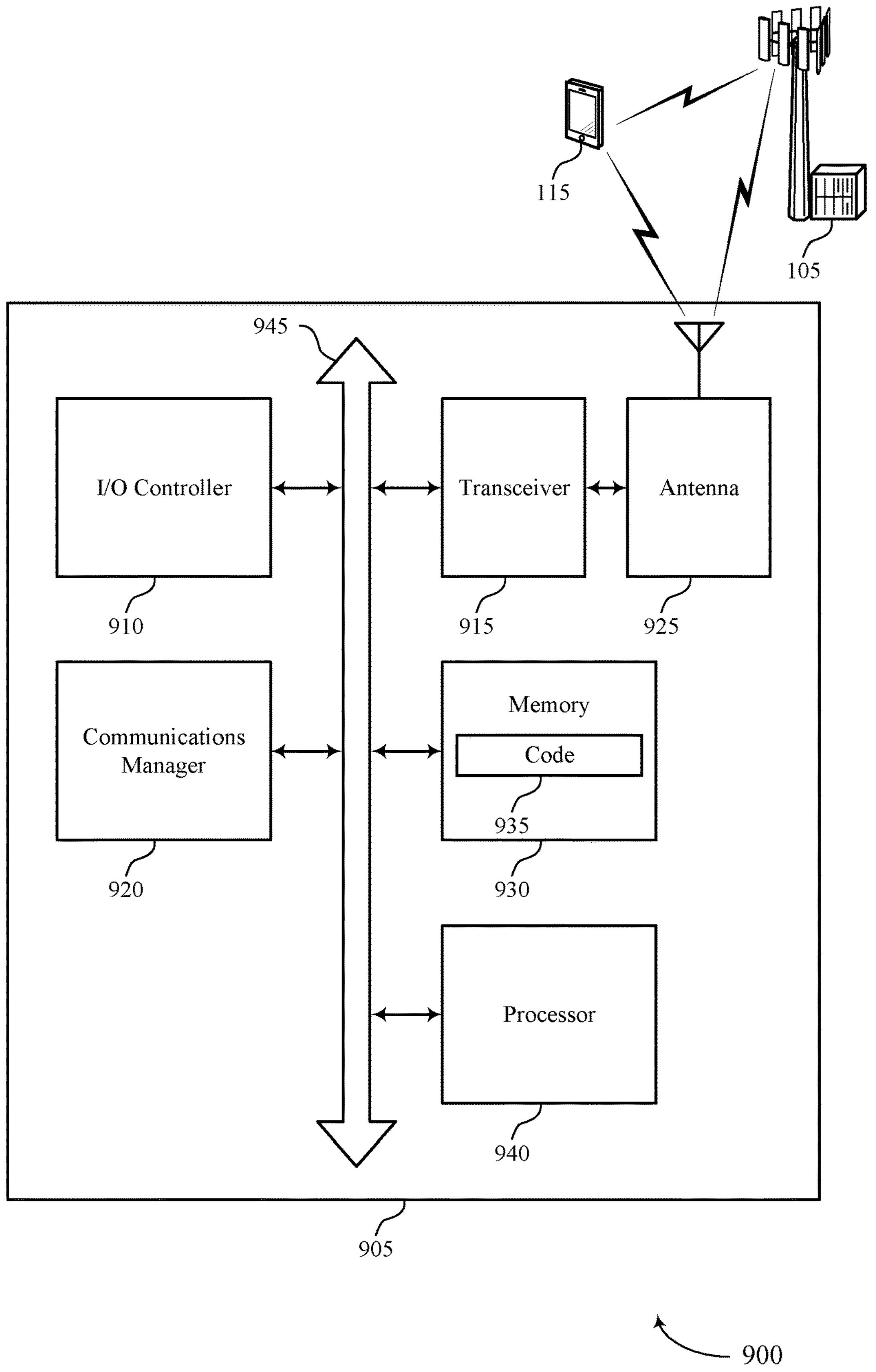
FIG. 9 shows a diagram of a system including a device that supports techniques for extended CSI-RS ports in accordance with one or more aspects of the present disclosure.

FIG. 9 shows a diagram of a system 900 including a device 905 that supports techniques for extended CSI-RS ports in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for extended CSI-RS ports). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The communications manager 920 is capable of, configured to, or operable to support a means for receiving, from the network entity, the CSI-RS via the quantity of CSI-RS ports in accordance with the first CSI-RS port pattern. The communications manager 920 is capable of, configured to, or operable to support a means for estimating a channel based on the received CSI-RS.

By including or configuring the communications manager 920 in accordance with examples as described herein, the device 905 may support techniques for more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for extended CSI-RS ports as described herein, or the at least one processor 940 and the at least one memory 930 may be otherwise configured to, individually or collectively, perform or support such operations.

Figure 10:
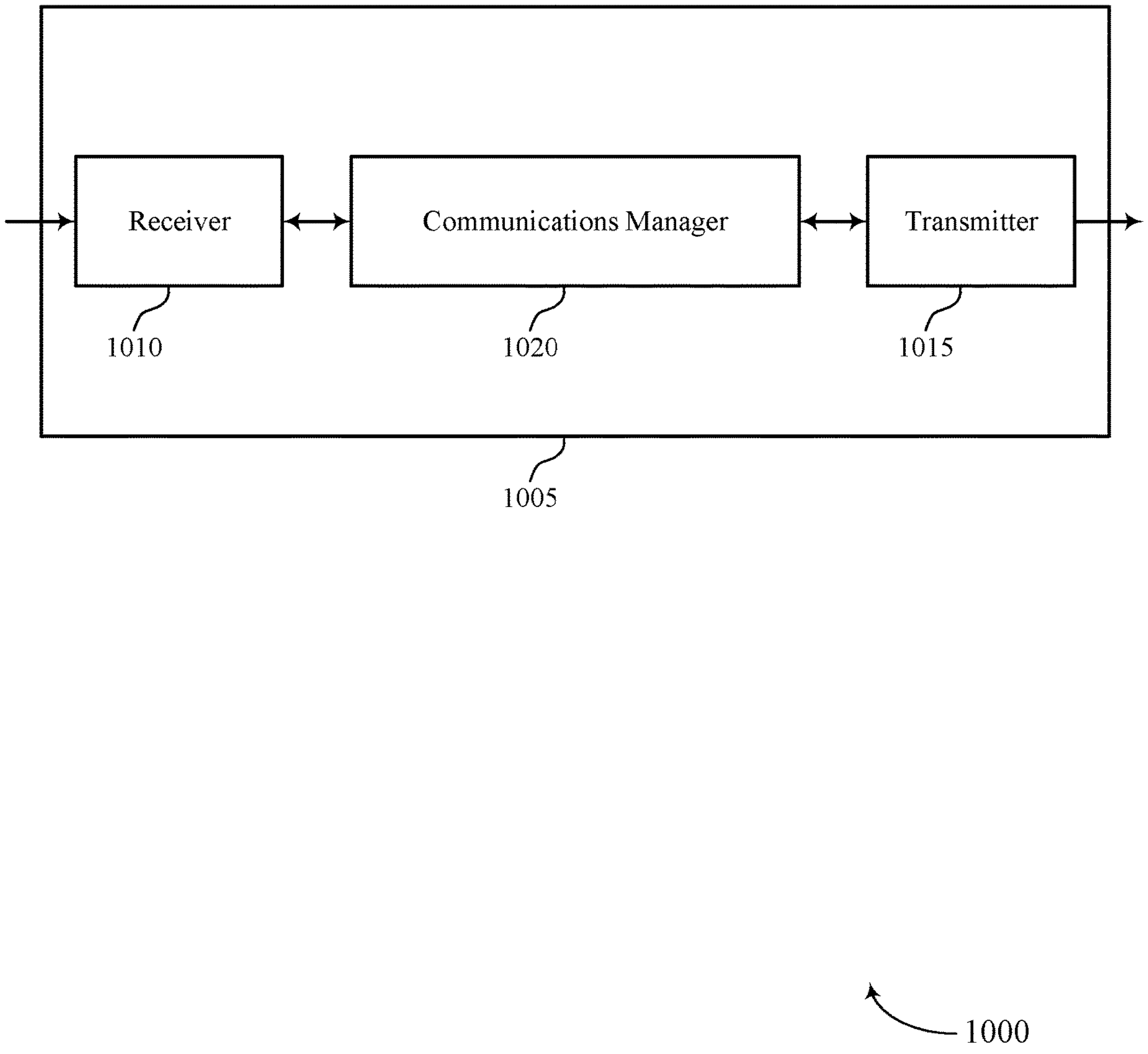
FIGS. 10 and 11 show block diagrams of devices that support techniques for extended CSI-RS ports in accordance with one or more aspects of the present disclosure.

FIG. 10 shows a block diagram 1000 of a device 1005 that supports techniques for extended CSI-RS ports in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of techniques for extended CSI-RS ports as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The communications manager 1020 is capable of, configured to, or operable to support a means for transmitting, to the UE, the CSI-RS via the quantity of CSI-RS ports in accordance with the first CSI-RS port pattern.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
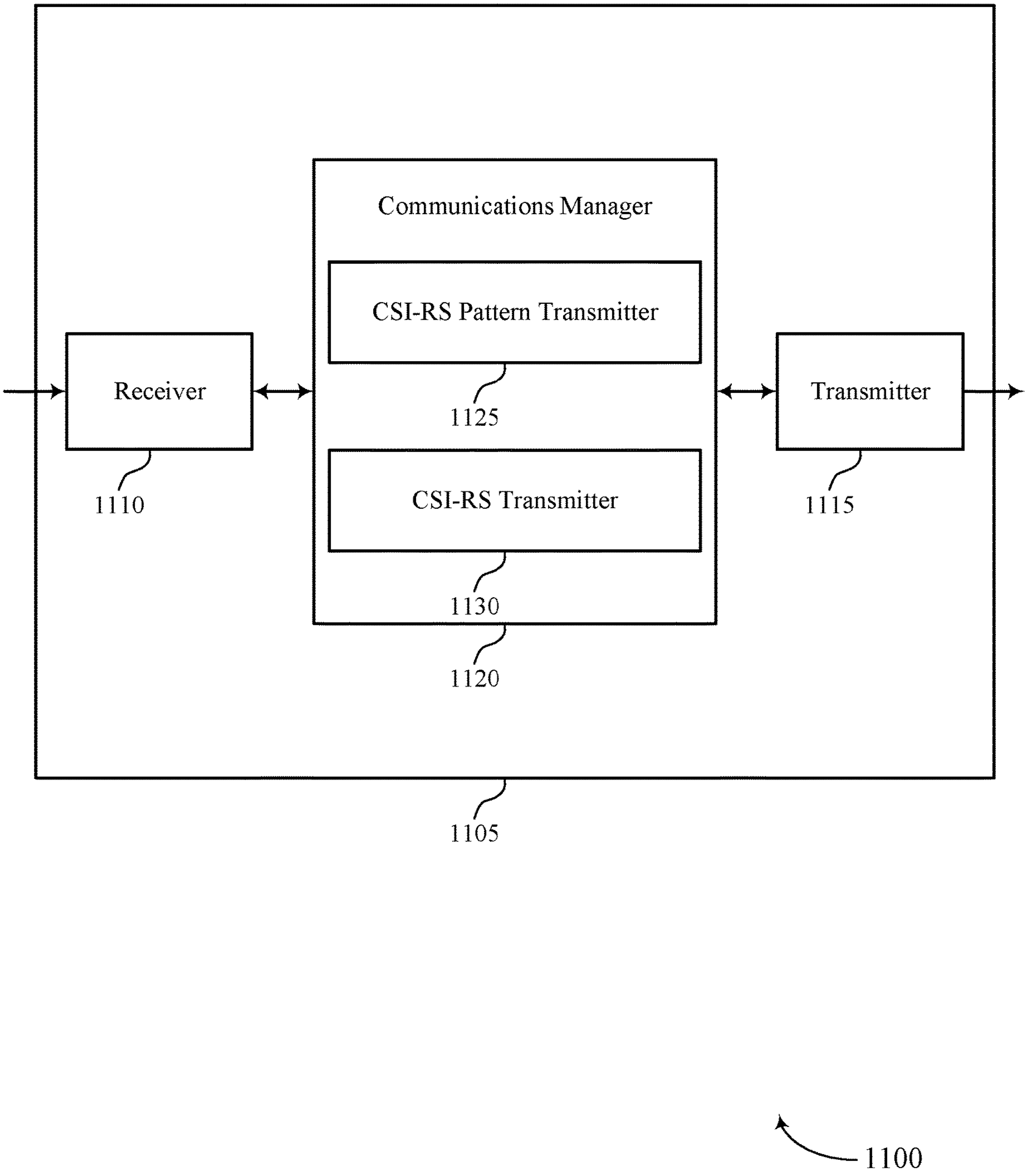

FIG. 11 shows a block diagram 1100 of a device 1105 that supports techniques for extended CSI-RS ports in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for extended CSI-RS ports as described herein. For example, the communications manager 1120 may include a CSI-RS pattern transmitter 1125 a CSI-RS transmitter 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The CSI-RS pattern transmitter 1125 is capable of, configured to, or operable to support a means for transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The CSI-RS transmitter 1130 is capable of, configured to, or operable to support a means for transmitting, to the UE, the CSI-RS via the quantity of CSI-RS ports in accordance with the first CSI-RS port pattern.

Figure 12:
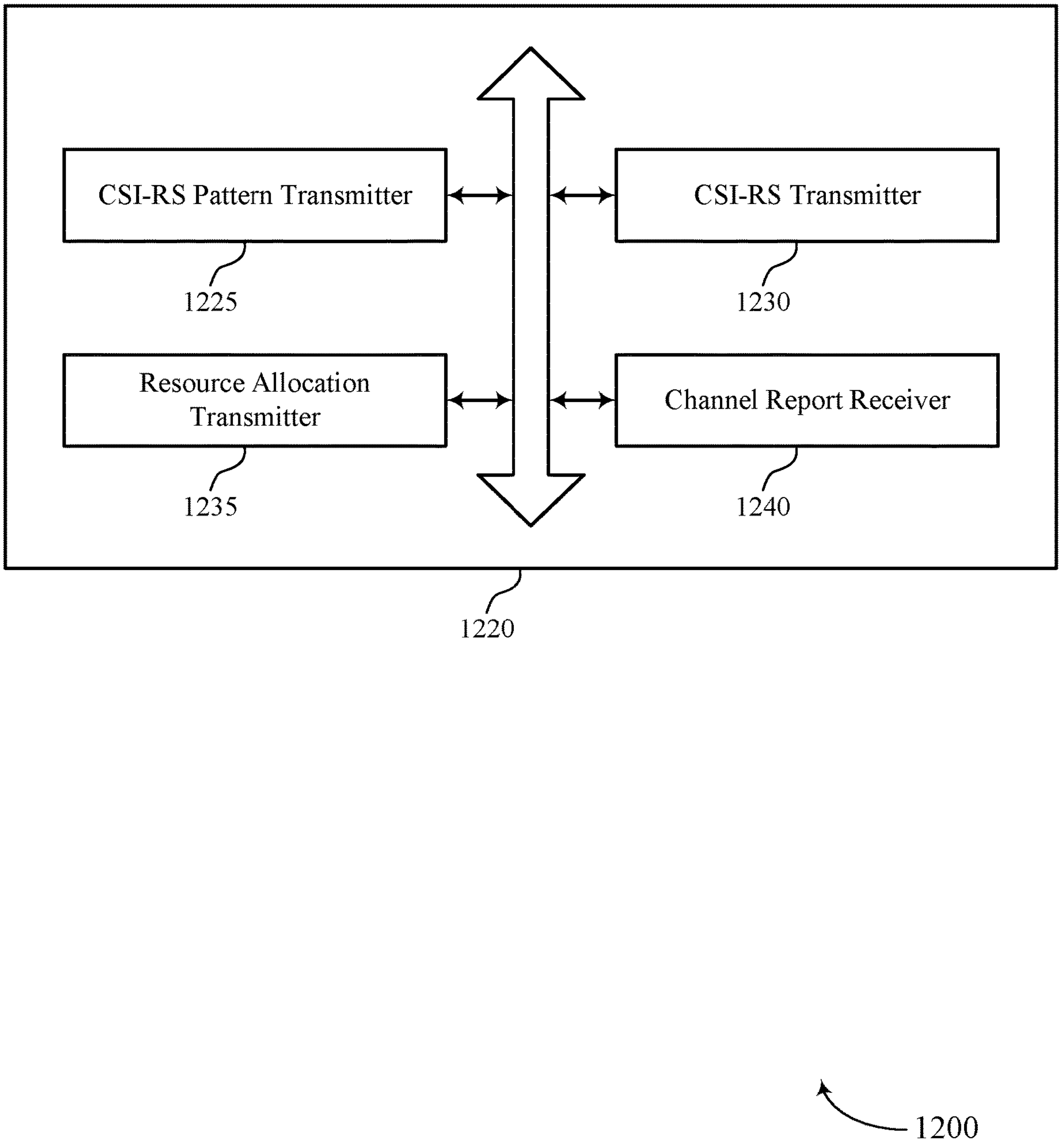
FIG. 12 shows a block diagram of a communications manager that supports techniques for extended CSI-RS ports in accordance with one or more aspects of the present disclosure.

FIG. 12 shows a block diagram 1200 of a communications manager 1220 that supports techniques for extended CSI-RS ports in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for extended CSI-RS ports as described herein. For example, the communications manager 1220 may include a CSI-RS pattern transmitter 1225, a CSI-RS transmitter 1230, a resource allocation transmitter 1235, a channel report receiver 1240, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The CSI-RS pattern transmitter 1225 is capable of, configured to, or operable to support a means for transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The CSI-RS transmitter 1230 is capable of, configured to, or operable to support a means for transmitting, to the UE, the CSI-RS via the quantity of CSI-RS ports in accordance with the first CSI-RS port pattern.

In some examples, the extension of the set of multiple CDM groups in the time domain includes extensions to each of the set of multiple CDM groups of the second CSI-RS port pattern, the extensions duplicates, in the time domain, each of the set of multiple CDM groups.

In some examples, the extension of the set of multiple CDM groups in the time domain includes one or more CDM groups in addition to the set of multiple CDM groups of the second CSI-RS port pattern, the one or more additional CDM groups being time division multiplexed in addition to the set of multiple CDM groups.

In some examples, the resource allocation transmitter 1235 is capable of, configured to, or operable to support a means for transmitting, to the UE, a resource allocation indicating a quantity of resource blocks to be used for receiving the CSI-RS, where transmitting the CSI-RS is in accordance with the resource allocation.

In some examples, the quantity of resource blocks is in accordance with a multiple of the quantity of CSI-RS ports, the multiple based on the quantity of CSI-RS ports.

In some examples, the quantity of resource blocks is based on an inverse of a density of the first CSI-RS port pattern.

In some examples, the channel report receiver 1240 is capable of, configured to, or operable to support a means for receiving, from the UE, a channel report based on transmitting the CSI-RS.

In some examples, the first CSI-RS port pattern and the second CSI-RS port pattern are of a set of multiple CSI-RS port patterns.

In some examples, the quantity of CSI-RS ports is 128.

Figure 13:
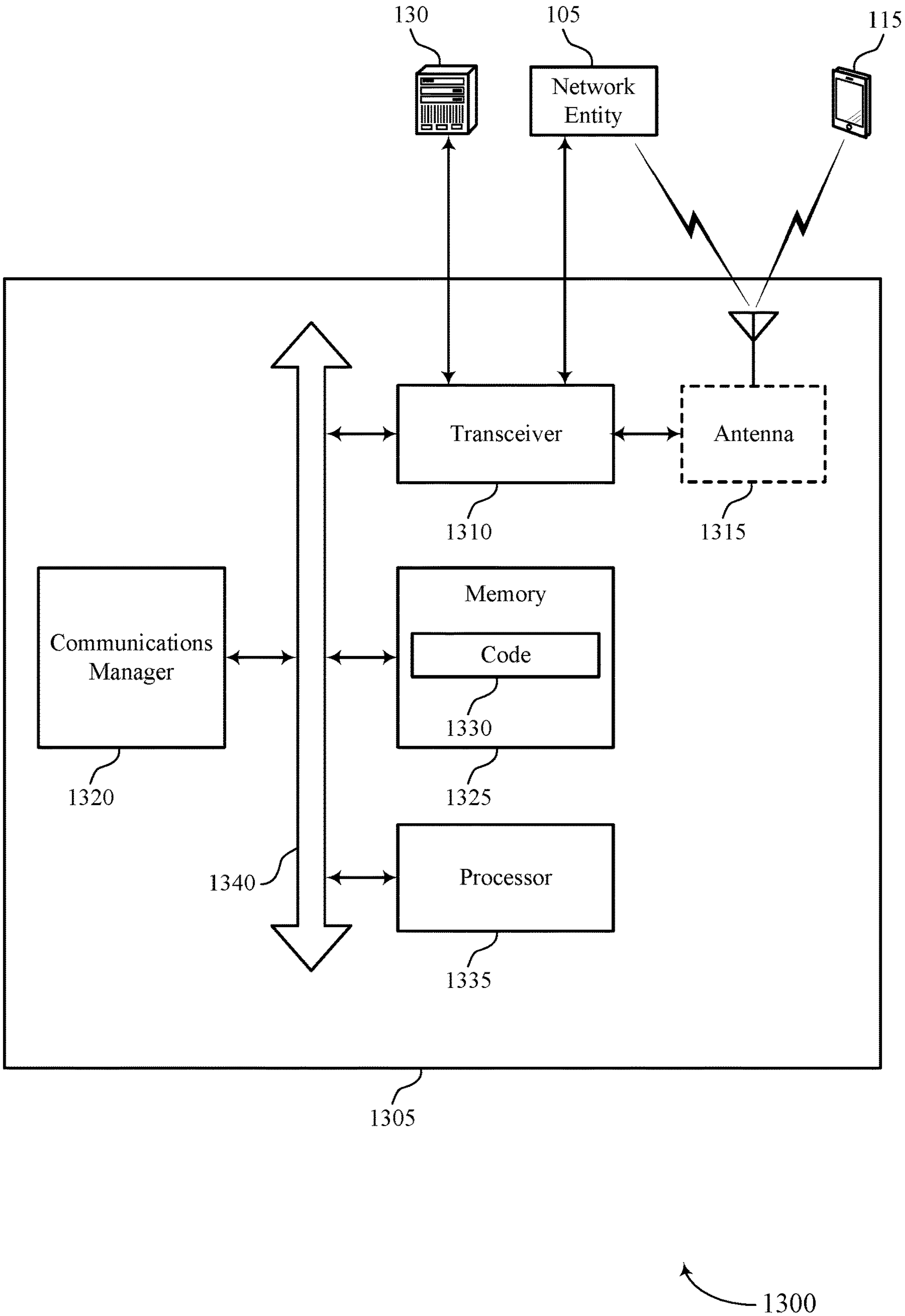
FIG. 13 shows a diagram of a system including a device that supports techniques for extended CSI-RS ports in accordance with one or more aspects of the present disclosure.

FIG. 13 shows a diagram of a system 1300 including a device 1305 that supports techniques for extended CSI-RS ports in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for extended CSI-RS ports). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The communications manager 1320 is capable of, configured to, or operable to support a means for transmitting, to the UE, the CSI-RS via the quantity of CSI-RS ports in accordance with the first CSI-RS port pattern.

By including or configuring the communications manager 1320 in accordance with examples as described herein, the device 1305 may support techniques for more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for extended CSI-RS ports as described herein, or the at least one processor 1335 and the at least one memory 1325 may be otherwise configured to, individually or collectively, perform or support such operations.

Figure 14:
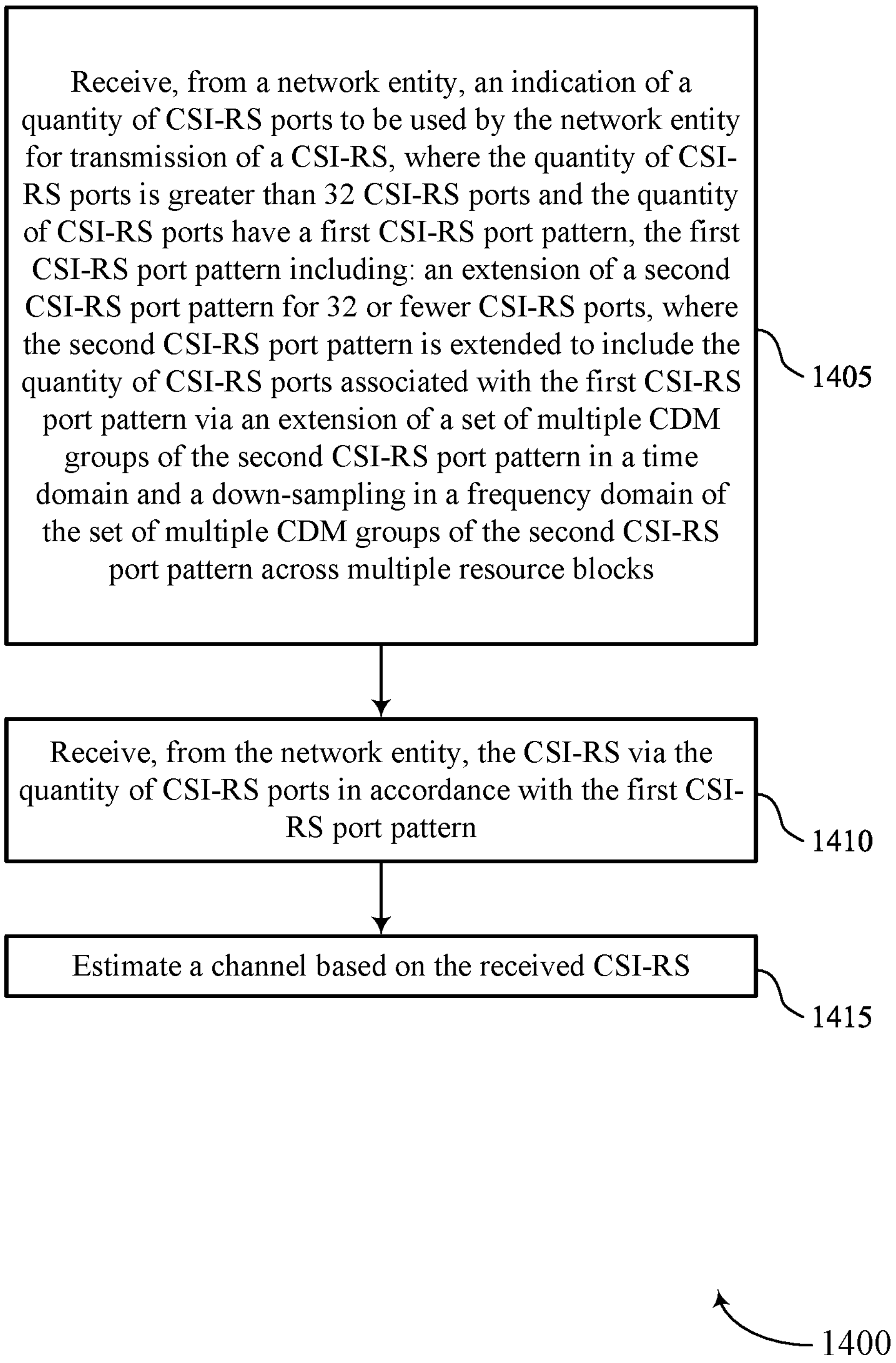
FIGS. 14 through 17 show flowcharts illustrating methods that support techniques for extended CSI-RS ports in accordance with one or more aspects of the present disclosure.

FIG. 14 shows a flowchart illustrating a method 1400 that supports techniques for extended CSI-RS ports in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The operations of 1405 may be performed in accordance with examples as disclosed herein. In some examples, aspects of the operations of 1405 may be performed by a CSI-RS pattern receiver 825 as described with reference to FIG. 8.

At 1410, the method may include receiving, from the network entity, the CSI-RS via the quantity of CSI-RS ports in accordance with the first CSI-RS port pattern. The operations of 1410 may be performed in accordance with examples as disclosed herein. In some examples, aspects of the operations of 1410 may be performed by a CSI-RS receiver 830 as described with reference to FIG. 8.

At 1415, the method may include estimating a channel based on the received CSI-RS. The operations of 1415 may be performed in accordance with examples as disclosed herein. In some examples, aspects of the operations of 1415 may be performed by a channel estimation component 835 as described with reference to FIG. 8.

Figure 15:
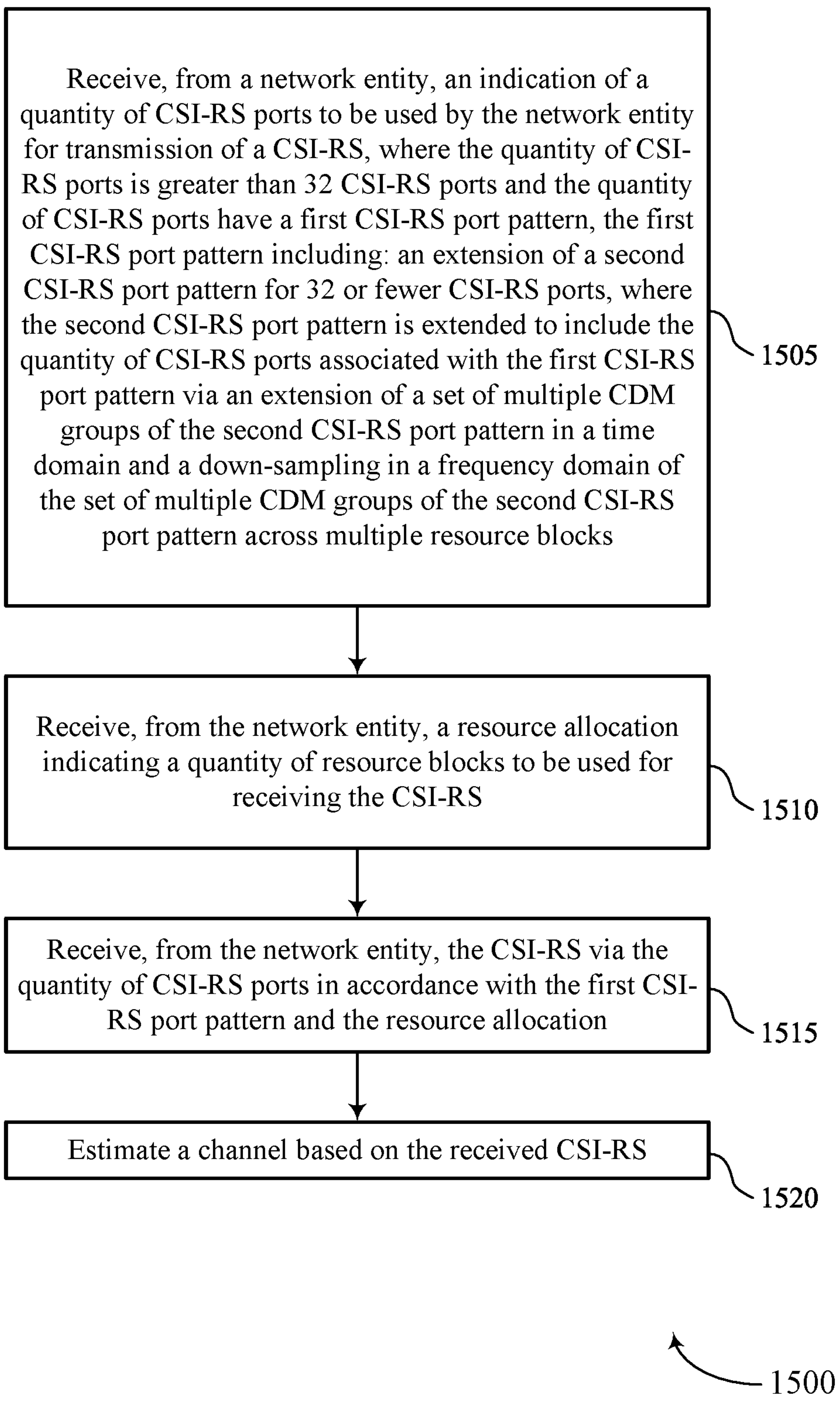

FIG. 15 shows a flowchart illustrating a method 1500 that supports techniques for extended CSI-RS ports in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS port pattern via an extension of a set of multiple CDM groups of the second CSI-RS port pattern in a time domain and a down-sampling in a frequency domain of the set of multiple CDM groups of the second CSI-RS port pattern across multiple resource blocks. The operations of 1505 may be performed in accordance with examples as disclosed herein. In some examples, aspects of the operations of 1505 may be performed by a CSI-RS pattern receiver 825 as described with reference to FIG. 8.

At 1510, the method may include receiving, from the network entity, a resource allocation indicating a quantity of resource blocks to be used for receiving the CSI-RS. The operations of 1510 may be performed in accordance with examples as disclosed herein. In some examples, aspects of the operations of 1510 may be performed by a resource allocation receiver 840 as described with reference to FIG. 8.

At 1515, the method may include receiving, from the network entity, the CSI-RS via the quantity of CSI-RS ports in accordance with the first CSI-RS port pattern and the resource allocation. The operations of 1515 may be performed in accordance with examples as disclosed herein. In some examples, aspects of the operations of 1515 may be performed by a CSI-RS receiver 830 as described with reference to FIG. 8.

At 1520, the method may include estimating a channel based on the received CSI-RS. The operations of 1520 may be performed in accordance with examples as disclosed herein. In some examples, aspects of the operations of 1520 may be performed by a channel estimation component 835 as described with reference to FIG. 8.

Figure 16:
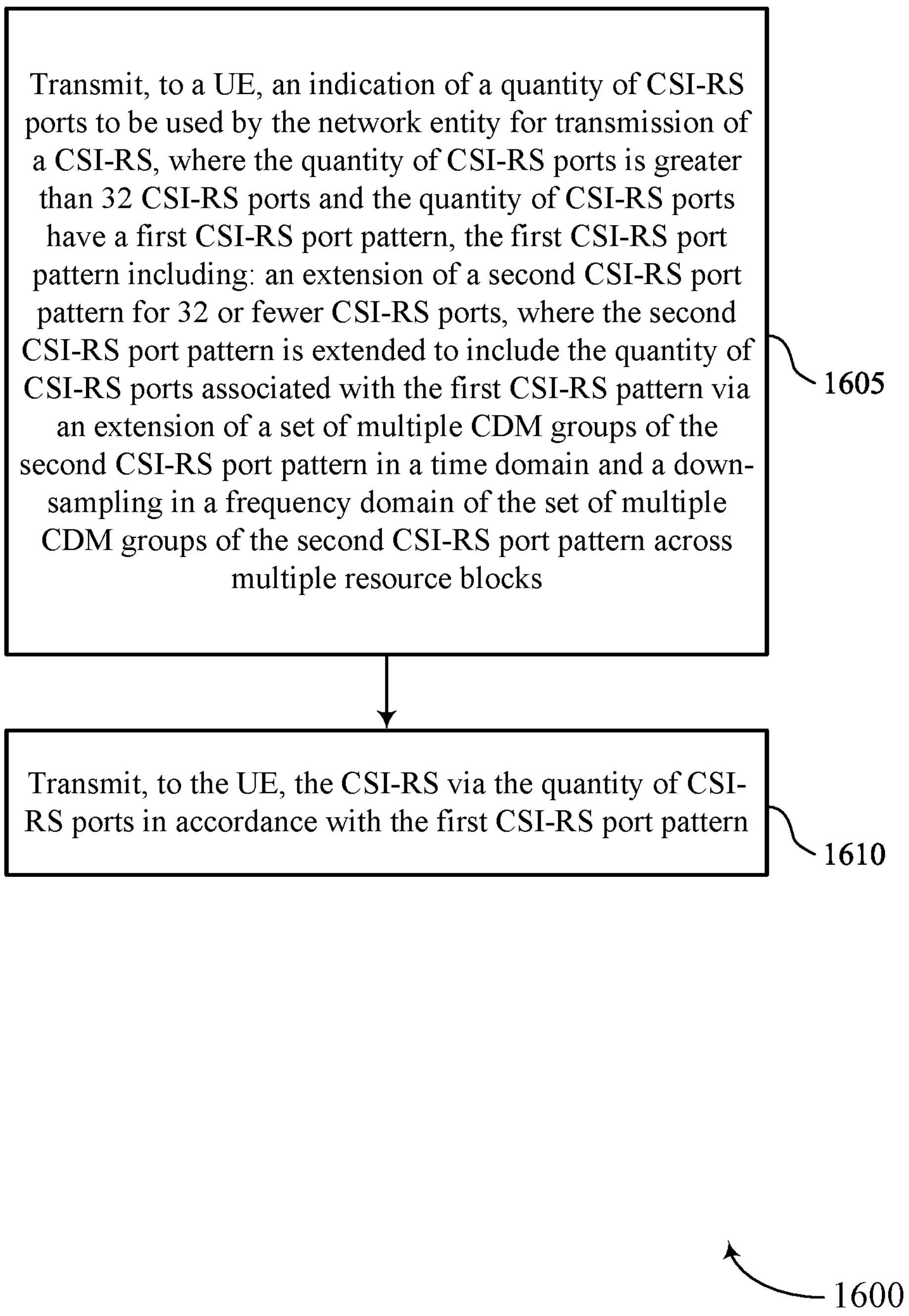

FIG. 16 shows a flowchart illustrating a method 1600 that supports techniques for extended CSI-RS ports in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The operations of 1605 may be performed in accordance with examples as disclosed herein. In some examples, aspects of the operations of 1605 may be performed by a CSI-RS pattern transmitter 1225 as described with reference to FIG. 12.

At 1610, the method may include transmitting, to the UE, the CSI-RS via the quantity of CSI-RS ports in accordance with the first CSI-RS port pattern. The operations of 1610 may be performed in accordance with examples as disclosed herein. In some examples, aspects of the operations of 1610 may be performed by a CSI-RS transmitter 1230 as described with reference to FIG. 12.

Figure 17:
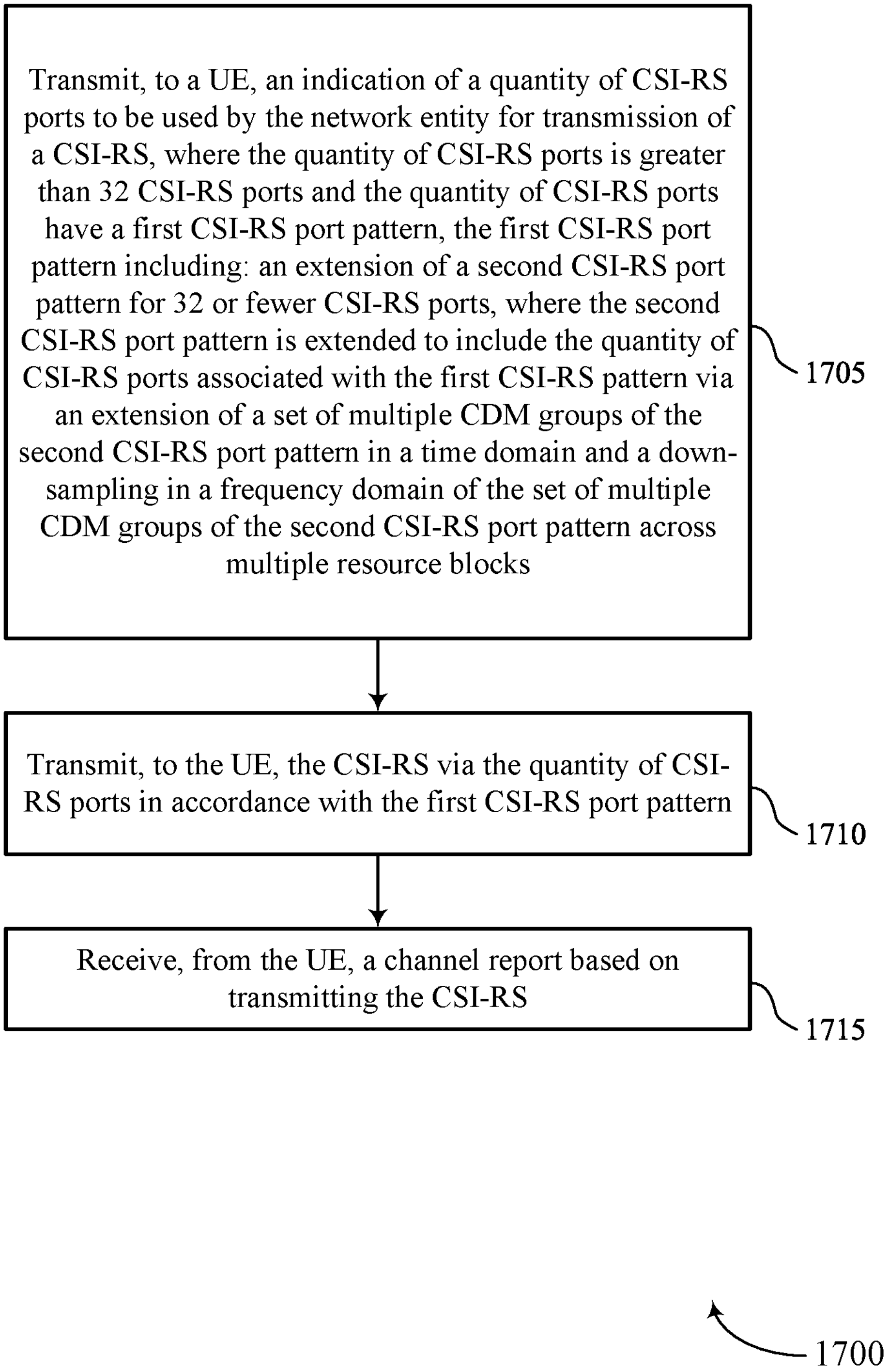

FIG. 17 shows a flowchart illustrating a method 1700 that supports techniques for extended CSI-RS ports in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, an indication of a quantity of CSI-RS ports to be used by the network entity for transmission of a CSI-RS, where the quantity of CSI-RS ports is greater than 32 CSI-RS ports and the quantity of CSI-RS ports have a first CSI-RS port pattern, the first CSI-RS port pattern including: an extension of a second CSI-RS port pattern for 32 or fewer CSI-RS ports, where the second CSI-RS port pattern is extended to include the quantity of CSI-RS ports associated with the first CSI-RS pattern via an extension of a set of multiple CDM groups of the second CSI-RS port pattern in a time domain and a down-sampling in a frequency domain of the set of multiple CDM groups of the second CSI-RS port pattern across multiple resource blocks. The operations of 1705 may be performed in accordance with examples as disclosed herein. In some examples, aspects of the operations of 1705 may be performed by a CSI-RS pattern transmitter 1225 as described with reference to FIG. 12.

At 1710, the method may include transmitting, to the UE, the CSI-RS via the quantity of CSI-RS ports in accordance with the first CSI-RS port pattern. The operations of 1710 may be performed in accordance with examples as disclosed herein. In some examples, aspects of the operations of 1710 may be performed by a CSI-RS transmitter 1230 as described with reference to FIG. 12.

At 1715, the method may include receiving, from the UE, a channel report based on transmitting the CSI-RS. The operations of 1715 may be performed in accordance with examples as disclosed herein. In some examples, aspects of the operations of 1715 may be performed by a channel report receiver 1240 as described with reference to FIG. 12.

The following provides an overview of aspects of the present disclosure:

Aspect 1: A method for wireless communications at a UE, comprising: receiving, from a network entity, an indication of a quantity of CSI-RS ports to be used by the network entity for transmission of a CSI-RS, wherein the quantity of CSI-RS ports is greater than 32 CSI-RS ports and the quantity of CSI-RS ports have a first CSI-RS port pattern, the first CSI-RS port pattern comprising: an extension of a second CSI-RS port pattern for 32 or fewer CSI-RS ports, wherein the second CSI-RS port pattern is extended to include the quantity of CSI-RS ports associated with the first CSI-RS port pattern via an extension of a plurality of CDM groups of the second CSI-RS port pattern in a time domain and a down-sampling in a frequency domain of the plurality of CDM groups of the second CSI-RS port pattern across multiple resource blocks; receiving, from the network entity, the CSI-RS via the quantity of CSI-RS ports in accordance with the first CSI-RS port pattern; and estimating a channel based at least in part on the received CSI-RS.

Aspect 2: The method of aspect 1, wherein the extension of the plurality of CDM groups in the time domain comprises extensions to each of the plurality of CDM groups of the second CSI-RS port pattern, the extensions duplicates, in the time domain, each of the plurality of CDM groups.

Aspect 3: The method of any of aspects 1 through 2, wherein the extension of the plurality of CDM groups in the time domain comprises one or more CDM groups in addition to the plurality of CDM groups of the second CSI-RS port pattern, the one or more additional CDM groups being time division multiplexed in addition to the plurality of CDM groups.

Aspect 4: The method of any of aspects 1 through 3, further comprising: receiving, from the network entity, a resource allocation indicating a quantity of resource blocks to be used for receiving the CSI-RS, wherein receiving the CSI-RS is in accordance with the resource allocation.

Aspect 5: The method of aspect 4, wherein the quantity of resource blocks is in accordance with a multiple of the quantity of CSI-RS ports, the multiple based at least in part on the quantity of CSI-RS ports.

Aspect 6: The method of any of aspects 4 through 5, wherein the quantity of resource blocks is based at least in part on an inverse of a density of the first CSI-RS port pattern.

Aspect 7: The method of any of aspects 1 through 6, wherein estimating the channel comprises: de-spreading the received CSI-RS, the de-spreading including a separation of the plurality of CDM groups according to the first CSI-RS port pattern; determining a channel impulse response based at least in part on a transformation of the CSI-RS from the frequency domain to the time domain via an IFFT; determining a denoised channel impulse response based at least in part on applying a cleaning algorithm to the determined channel impulse response; and determining an interpolated channel based at least in part on zero-padding the determined denoised channel response and applying a FFT, wherein the interpolated channel comprises an estimate of the channel.

Aspect 8: The method of any of aspects 1 through 7, further comprising: transmitting, to the network entity, a channel report based at least in part on estimating the channel.

Aspect 9: The method of any of aspects 1 through 8, wherein the first CSI-RS port pattern and the second CSI-RS port pattern are of a plurality of CSI-RS port patterns.

Aspect 10: The method of any of aspects 1 through 9, wherein the quantity of CSI-RS ports is 128.

Aspect 11: A method for wireless communications at a network entity, comprising: transmitting, to a UE, an indication of a quantity of CSI-RS ports to be used by the network entity for transmission of a CSI-RS, wherein the quantity of CSI-RS ports is greater than 32 CSI-RS ports and the quantity of CSI-RS ports have a first CSI-RS port pattern, the first CSI-RS port pattern comprising: an extension of a second CSI-RS port pattern for 32 or fewer CSI-RS ports, wherein the second CSI-RS port pattern is extended to include the quantity of CSI-RS ports associated with the first CSI-RS pattern via an extension of a plurality of CDM groups of the second CSI-RS port pattern in a time domain and a down-sampling in a frequency domain of the plurality of CDM groups of the second CSI-RS port pattern across multiple resource blocks; and transmitting, to the UE, the CSI-RS via the quantity of CSI-RS ports in accordance with the first CSI-RS port pattern.

Aspect 12: The method of aspect 11, wherein the extension of the plurality of CDM groups in the time domain comprises extensions to each of the plurality of CDM groups of the second CSI-RS port pattern, the extensions duplicates, in the time domain, each of the plurality of CDM groups.

Aspect 13: The method of any of aspects 11 through 12, wherein the extension of the plurality of CDM groups in the time domain comprises one or more CDM groups in addition to the plurality of CDM groups of the second CSI-RS port pattern, the one or more additional CDM groups being time division multiplexed in addition to the plurality of CDM groups.

Aspect 14: The method of any of aspects 11 through 13, further comprising: transmitting, to the UE, a resource allocation indicating a quantity of resource blocks to be used for receiving the CSI-RS, wherein transmitting the CSI-RS is in accordance with the resource allocation.

Aspect 15: The method of aspect 14, wherein the quantity of resource blocks is in accordance with a multiple of the quantity of CSI-RS ports, the multiple based at least in part on the quantity of CSI-RS ports.

Aspect 16: The method of any of aspects 14 through 15, wherein the quantity of resource blocks is based at least in part on an inverse of a density of the first CSI-RS port pattern.

Aspect 17: The method of any of aspects 11 through 16, further comprising: receiving, from the UE, a channel report based at least in part on transmitting the CSI-RS.

Aspect 18: The method of any of aspects 11 through 17, wherein the first CSI-RS port pattern and the second CSI-RS port pattern are of a plurality of CSI-RS port patterns.

Aspect 19: The method of any of aspects 11 through 18, wherein the quantity of CSI-RS ports is 128.

Aspect 20: A UE for wireless communications, comprising one or more memories storing processor-executable code, and one or more processors coupled with the one or more memories and individually or collectively operable to execute the code to cause the UE to perform a method of any of aspects 1 through 10.

Aspect 21: A UE for wireless communications, comprising at least one means for performing a method of any of aspects 1 through 10.

Aspect 22: A non-transitory computer-readable medium storing code for wireless communications, the code comprising instructions executable by one or more processors to perform a method of any of aspects 1 through 10.

Aspect 23: A network entity for wireless communications, comprising one or more memories storing processor-executable code, and one or more processors coupled with the one or more memories and individually or collectively operable to execute the code to cause the network entity to perform a method of any of aspects 11 through 19.

Aspect 24: A network entity for wireless communications, comprising at least one means for performing a method of any of aspects 11 through 19.

Aspect 25: A non-transitory computer-readable medium storing code for wireless communications, the code comprising instructions executable by one or more processors to perform a method of any of aspects 11 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, from a network entity, an indication of a quantity of channel state information (CSI)-reference signal (RS) ports to be used by the network entity for transmission of a CSI-RS, wherein the quantity of CSI-RS ports is greater than 32 CSI-RS ports and the quantity of CSI-RS ports have a first CSI-RS port pattern, the first CSI-RS port pattern comprising:

an extension of a second CSI-RS port pattern for 32 or fewer CSI-RS ports, wherein the second CSI-RS port pattern is extended to include the quantity of CSI-RS ports associated with the first CSI-RS port pattern via an extension of a plurality of code division multiplexing (CDM) groups of the second CSI-RS port pattern in a time domain and a down-sampling in a frequency domain of the plurality of CDM groups of the second CSI-RS port pattern across multiple resource blocks;

receive, from the network entity, the CSI-RS via the quantity of CSI-RS ports in accordance with the first CSI-RS port pattern; and estimate a channel based at least in part on the received CSI-RS.

2. The UE of claim 1, wherein the extension of the plurality of CDM groups in the time domain comprises extensions to each of the plurality of CDM groups of the second CSI-RS port pattern, the extensions duplicates, in the time domain, each of the plurality of CDM groups.

3. The UE of claim 1, wherein the extension of the plurality of CDM groups in the time domain comprises one or more CDM groups in addition to the plurality of CDM groups of the second CSI-RS port pattern, the one or more additional CDM groups being time division multiplexed in addition to the plurality of CDM groups.

4. The UE of claim 1, wherein the one or more processors are individually or collectively further operable to execute the code to cause the UE to:

receive, from the network entity, a resource allocation indicating a quantity of resource blocks to be used for receiving the CSI-RS, wherein receiving the CSI-RS is in accordance with the resource allocation.

5. The UE of claim 4, wherein the quantity of resource blocks is in accordance with a multiple of the quantity of CSI-RS ports, the multiple based at least in part on the quantity of CSI-RS ports.

6. The UE of claim 4, wherein the quantity of resource blocks is based at least in part on an inverse of a density of the first CSI-RS port pattern.

7. The UE of claim 1, wherein, to estimate the channel, the one or more processors are individually or collectively operable to execute the code to cause the UE to:

de-spread the received CSI-RS, the de-spreading including a separation of the plurality of CDM groups according to the first CSI-RS port pattern;

determine a channel impulse response based at least in part on a transformation of the CSI-RS from the frequency domain to the time domain via an inverse fast Fourier transform (IFFT);

determine a denoised channel impulse response based at least in part on applying a cleaning algorithm to the determined channel impulse response; and determine an interpolated channel based at least in part on zero-padding the determined denoised channel response and applying a fast Fourier transform (FFT), wherein the interpolated channel comprises an estimate of the channel.

8. The UE of claim 1, wherein the one or more processors are individually or collectively further operable to execute the code to cause the UE to:

transmit, to the network entity, a channel report based at least in part on estimating the channel.

9. The UE of claim 1, wherein the first CSI-RS port pattern and the second CSI-RS port pattern are of a plurality of CSI-RS port patterns.

10. The UE of claim 1, wherein:

the quantity of CSI-RS ports is 128.

11. A network entity, comprising:

one or more memories storing processor-executable code; and one or more processors coupled with the one or more memories and individually or collectively operable to execute the code to cause the network entity to:

transmit, to a user equipment (UE), an indication of a quantity of channel state information (CSI)-reference signal (RS) ports to be used by the network entity for transmission of a CSI-RS, wherein the quantity of CSI-RS ports is greater than 32 CSI-RS ports and the quantity of CSI-RS ports have a first CSI-RS port pattern, the first CSI-RS port pattern comprising:

an extension of a second CSI-RS port pattern for 32 or fewer CSI-RS ports, wherein the second CSI-RS port pattern is extended to include the quantity of CSI-RS ports associated with the first CSI-RS pattern via an extension of a plurality of code division multiplexing (CDM) groups of the second CSI-RS port pattern in a time domain and a down-sampling in a frequency domain of the plurality of CDM groups of the second CSI-RS port pattern across multiple resource blocks; and transmit, to the UE, the CSI-RS via the quantity of CSI-RS ports in accordance with the first CSI-RS port pattern.

12. The network entity of claim 11, wherein the extension of the plurality of CDM groups in the time domain comprises extensions to each of the plurality of CDM groups of the second CSI-RS port pattern, the extensions duplicates, in the time domain, each of the plurality of CDM groups.

13. The network entity of claim 11, wherein the extension of the plurality of CDM groups in the time domain comprises one or more CDM groups in addition to the plurality of CDM groups of the second CSI-RS port pattern, the one or more additional CDM groups being time division multiplexed in addition to the plurality of CDM groups.

14. The network entity of claim 11, wherein the one or more processors are individually or collectively further operable to execute the code to cause the network entity to:

transmit, to the UE, a resource allocation indicating a quantity of resource blocks to be used for receiving the CSI-RS, wherein transmitting the CSI-RS is in accordance with the resource allocation.

15. The network entity of claim 14, wherein the quantity of resource blocks is in accordance with a multiple of the quantity of CSI-RS ports, the multiple based at least in part on the quantity of CSI-RS ports.

16. The network entity of claim 14, wherein the quantity of resource blocks is based at least in part on an inverse of a density of the first CSI-RS port pattern.

17. The network entity of claim 11, wherein the one or more processors are individually or collectively further operable to execute the code to cause the network entity to:

receive, from the UE, a channel report based at least in part on transmitting the CSI-RS.

18. The network entity of claim 11, wherein the first CSI-RS port pattern and the second CSI-RS port pattern are of a plurality of CSI-RS port patterns.

19. A method for wireless communications at a user equipment (UE), comprising:

receiving, from a network entity, an indication of a quantity of channel state information (CSI)-reference signal (RS) ports to be used by the network entity for transmission of a CSI-RS, wherein the quantity of CSI-RS ports is greater than 32 CSI-RS ports and the quantity of CSI-RS ports have a first CSI-RS port pattern, the first CSI-RS port pattern comprising:

an extension of a second CSI-RS port pattern for 32 or fewer CSI-RS ports, wherein the second CSI-RS port pattern is extended to include the quantity of CSI-RS ports associated with the first CSI-RS port pattern via an extension of a plurality of code division multiplexing (CDM) groups of the second CSI-RS port pattern in a time domain and a down-sampling in a frequency domain of the plurality of CDM groups of the second CSI-RS port pattern across multiple resource blocks;

receiving, from the network entity, the CSI-RS via the quantity of CSI-RS ports in accordance with the first CSI-RS port pattern; and estimating a channel based at least in part on the received CSI-RS.

20. The method of claim 19, further comprising:

receiving, from the network entity, a resource allocation indicating a quantity of resource blocks to be used for receiving the CSI-RS, wherein receiving the CSI-RS is in accordance with the resource allocation.

* * * * *